(12) United States Patent
Sasaki

(10) Patent No.: US 11,954,368 B2
(45) Date of Patent: Apr. 9, 2024

(54) MEMORY SYSTEM CONTROLLING NONVOLATILE MEMORY

(71) Applicant: Kioxia Corporation, Tokyo (JP)

(72) Inventor: Tatsuya Sasaki, Ota (JP)

(73) Assignee: Kioxia Corporation, Tokyo (JP)

( * ) Notice: Subject to any disclaimer, the term of this patent is extended or adjusted under 35 U.S.C. 154(b) by 28 days.

(21) Appl. No.: 17/943,266

(22) Filed: Sep. 13, 2022

(65) Prior Publication Data

US 2023/0305750 A1 Sep. 28, 2023

(30) Foreign Application Priority Data

Mar. 23, 2022 (JP) ................................ 2022-047003

(51) Int. Cl.
*G06F 3/00* (2006.01)
*G06F 3/06* (2006.01)

(52) U.S. Cl.
CPC .......... *G06F 3/0659* (2013.01); *G06F 3/0622* (2013.01); *G06F 3/0664* (2013.01); *G06F 3/0679* (2013.01)

(58) Field of Classification Search
None
See application file for complete search history.

(56) References Cited

U.S. PATENT DOCUMENTS

| 9,819,739 | B2 | 11/2017 | Hussain et al. |
| 11,061,599 | B2 | 7/2021 | Gupta et al. |
| 2020/0218678 | A1* | 7/2020 | Prabhakar ............. G06F 13/385 |
| 2021/0318828 | A1 | 10/2021 | Valtonen |

* cited by examiner

*Primary Examiner* — Midys Rojas
(74) *Attorney, Agent, or Firm* — Oblon, McClelland, Maier & Neustadt, L.L.P.

(57) ABSTRACT

According to one embodiment, a memory system includes a communication interface connectable to a plurality of hosts. A virtual controller creation unit creates a virtual controller based on connection of a host to the communication interface. An access management unit manages permission information indicating a correspondence between each of the plurality of namespaces and a host permitted to access the namespace. The virtual controller creation unit create, based on the permission information, a first virtual controller to which a namespace that a first host connected to the communication interface is permitted to access is attached, as a virtual controller to be used by the first host to access a nonvolatile memory.

13 Claims, 38 Drawing Sheets

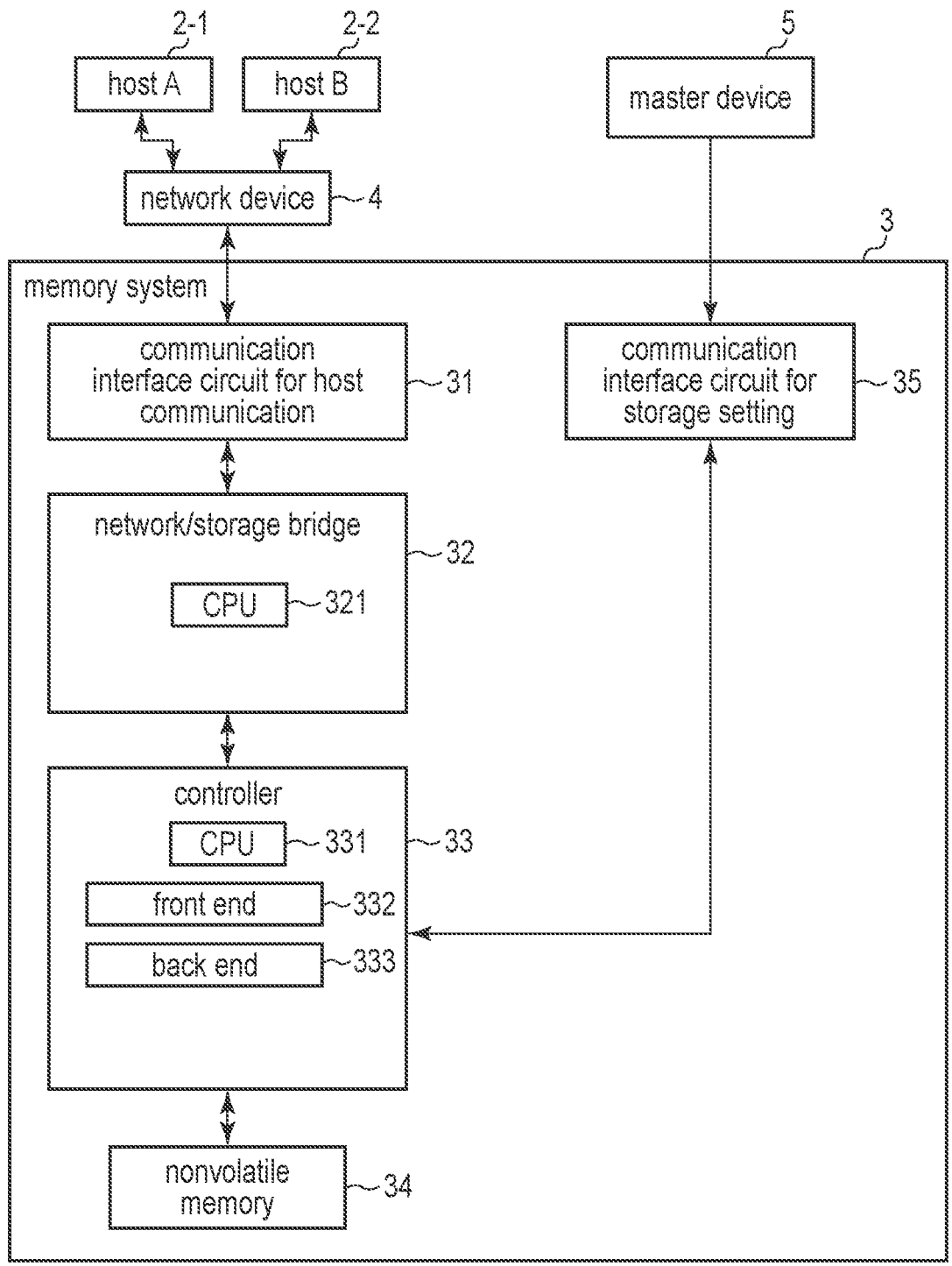
F I G. 6

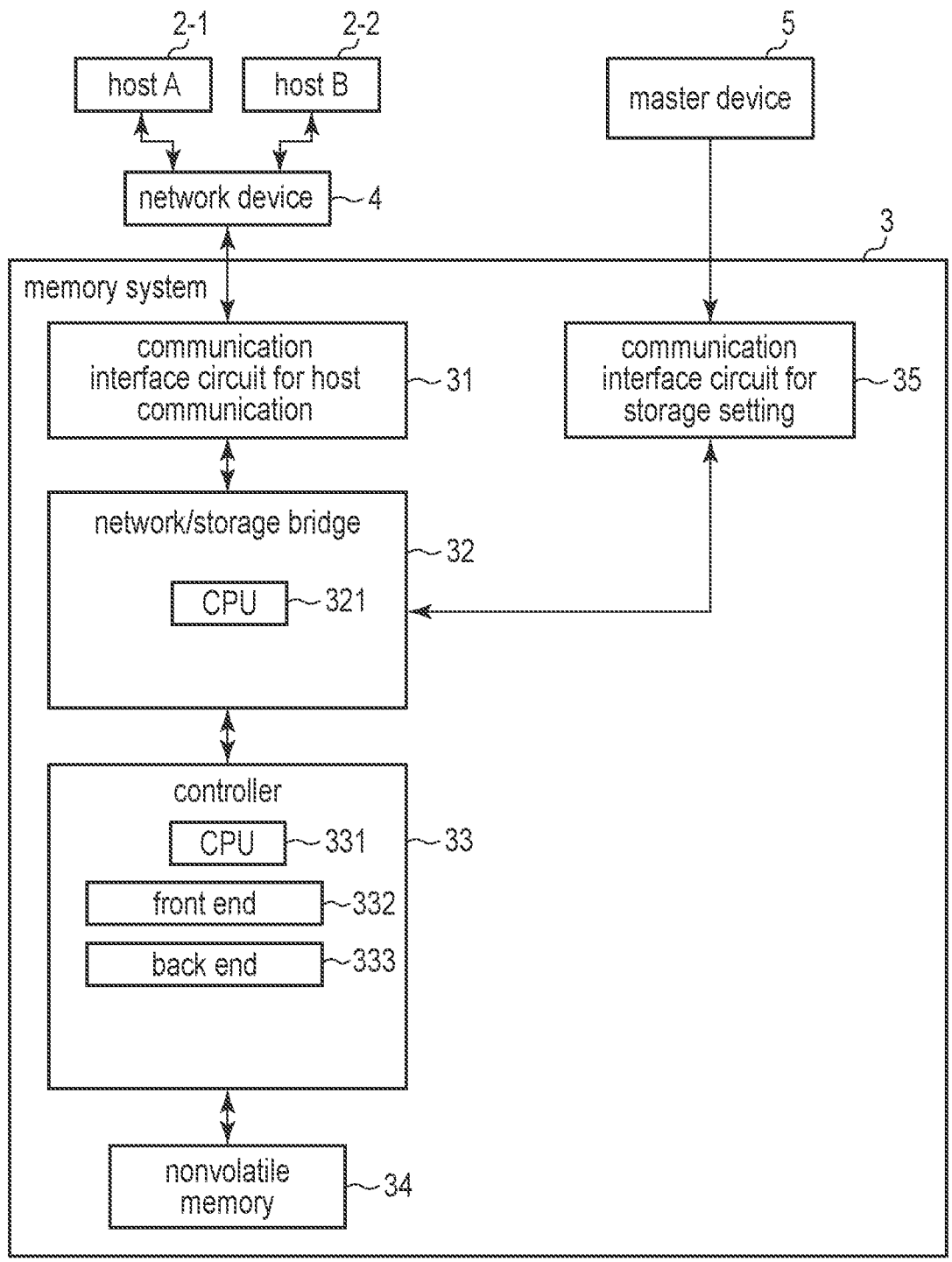
F I G. 9 access permission information

| namespace | permitted host |
|---|---|
| namespace A | host A |
| namespace B | host B |

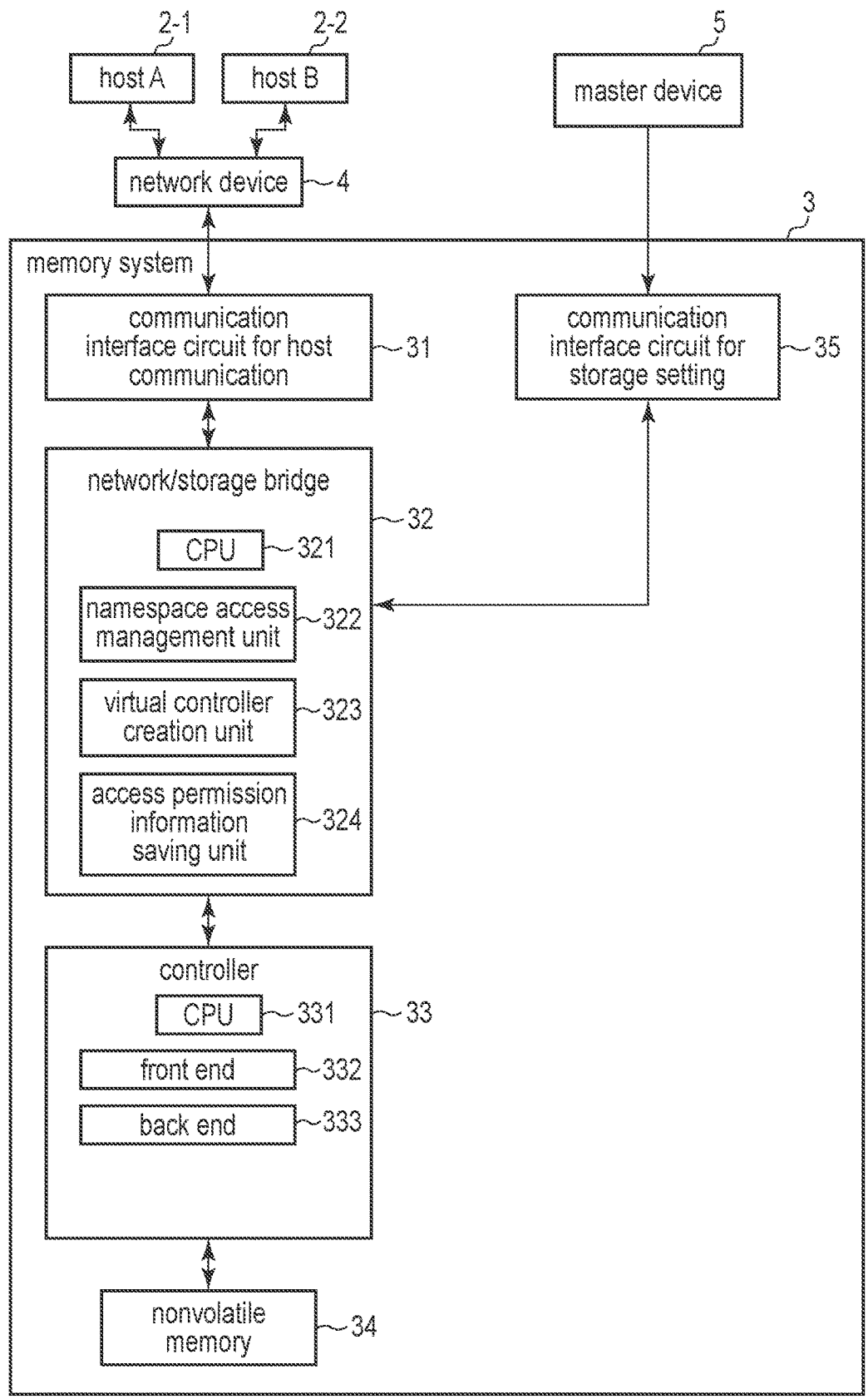
F I G. 18 namespace attach information

| namespace | attached host |
|---|---|
| namespace A | host A |
| namespace B | host B |

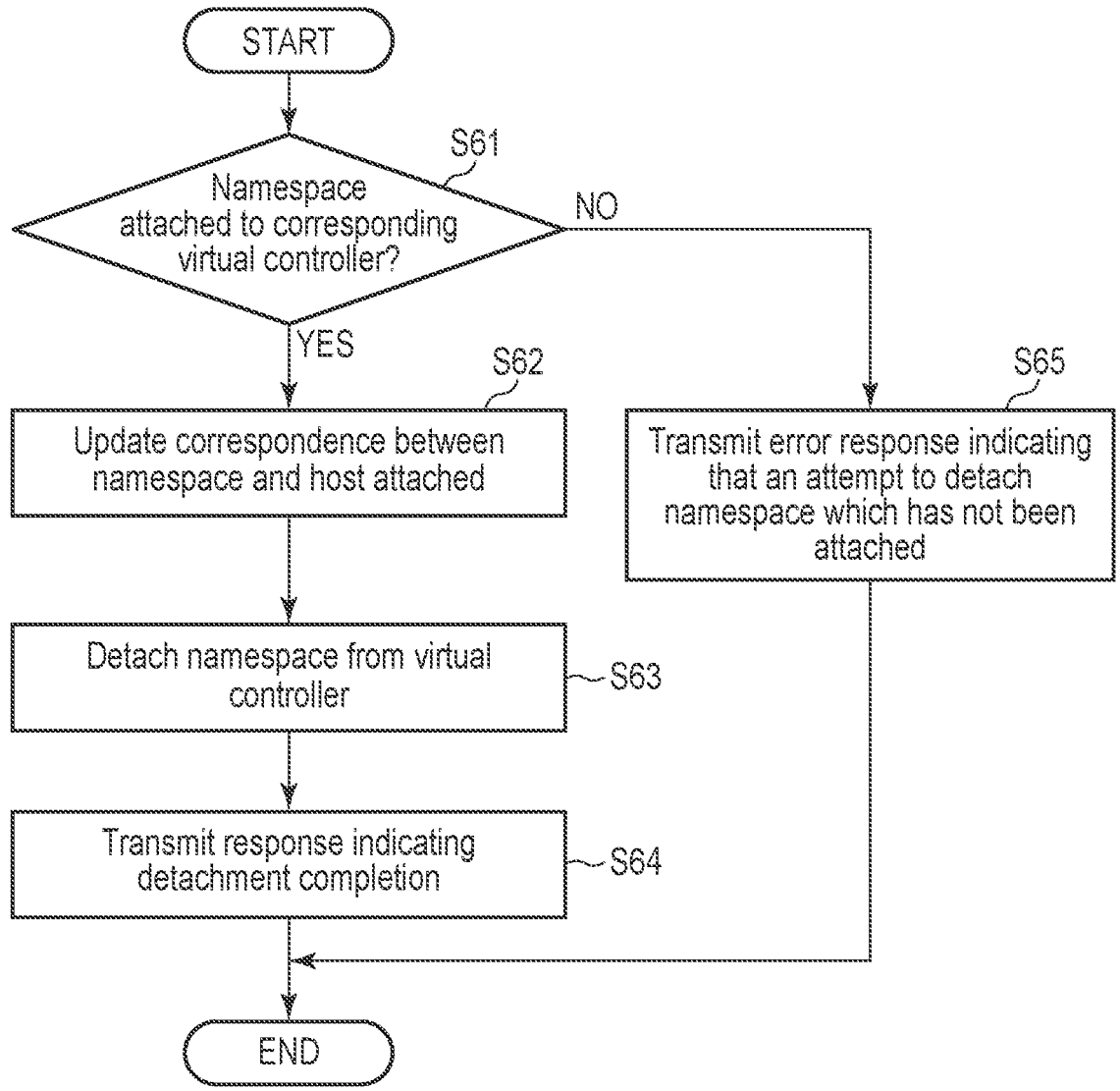
F I G. 31

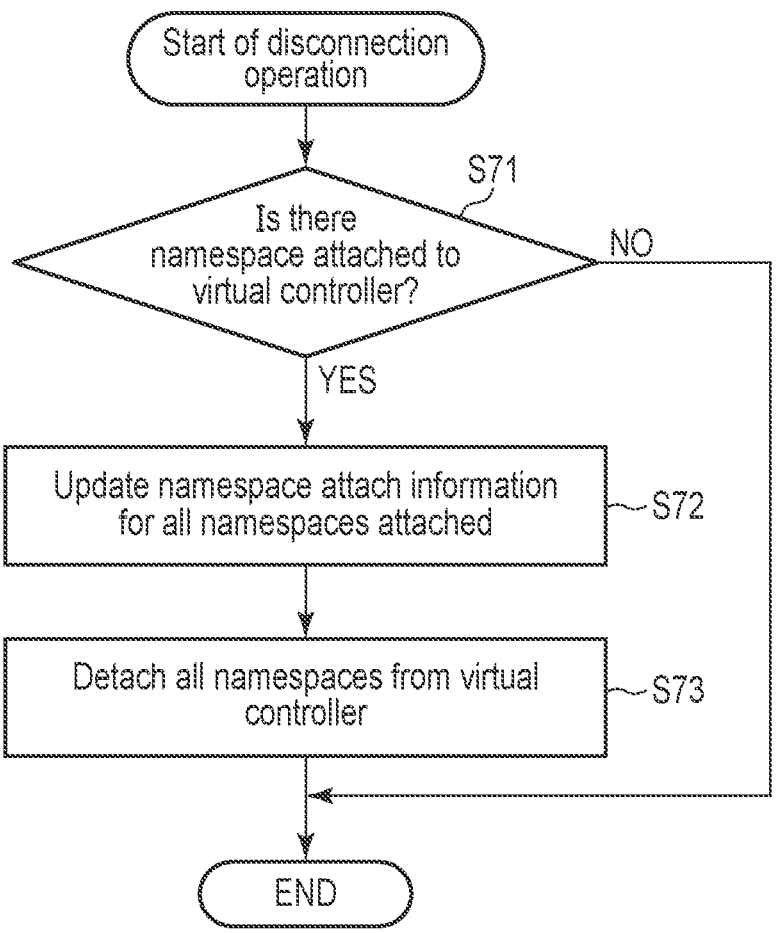
F I G. 32

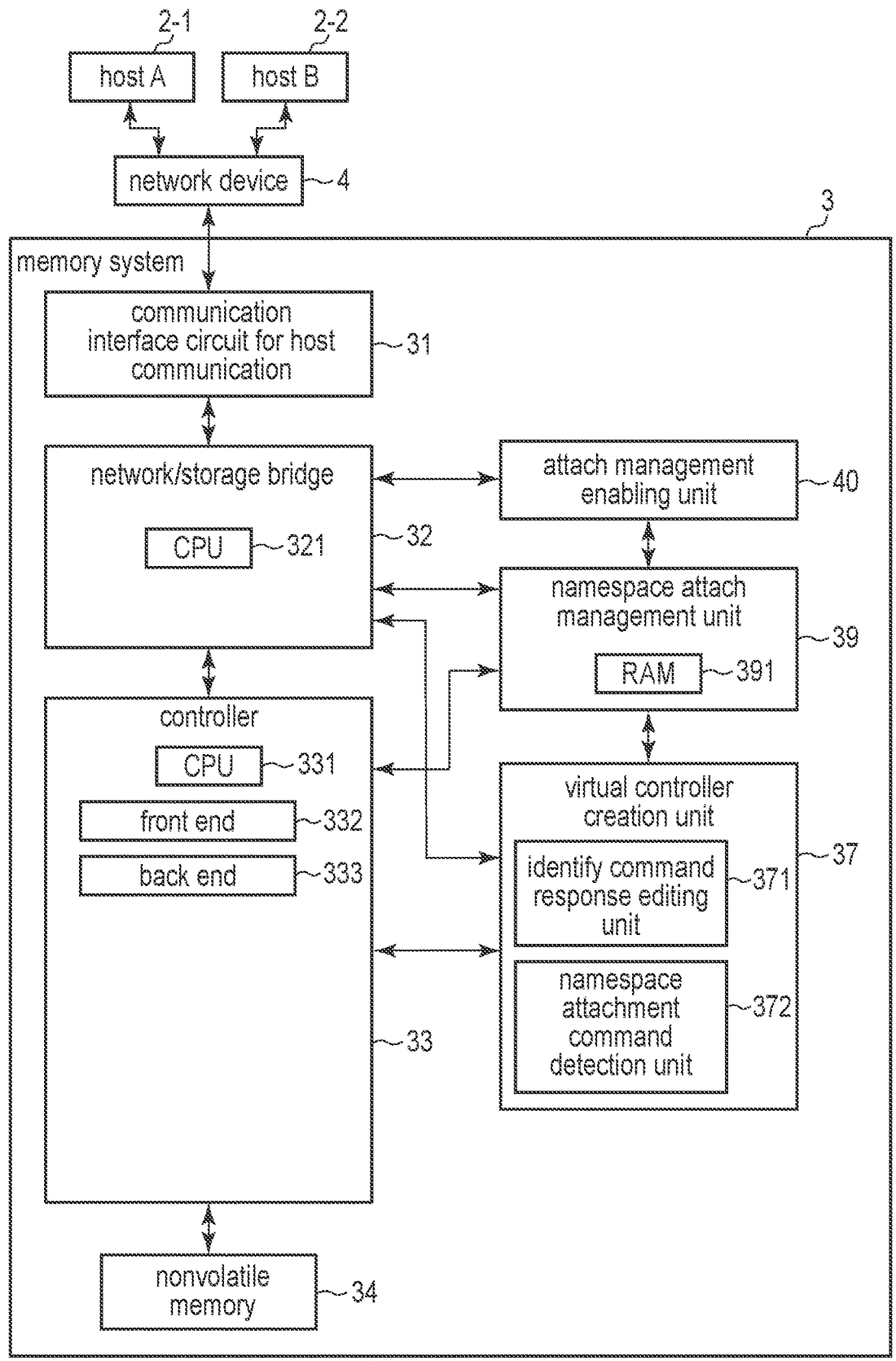
F I G. 33

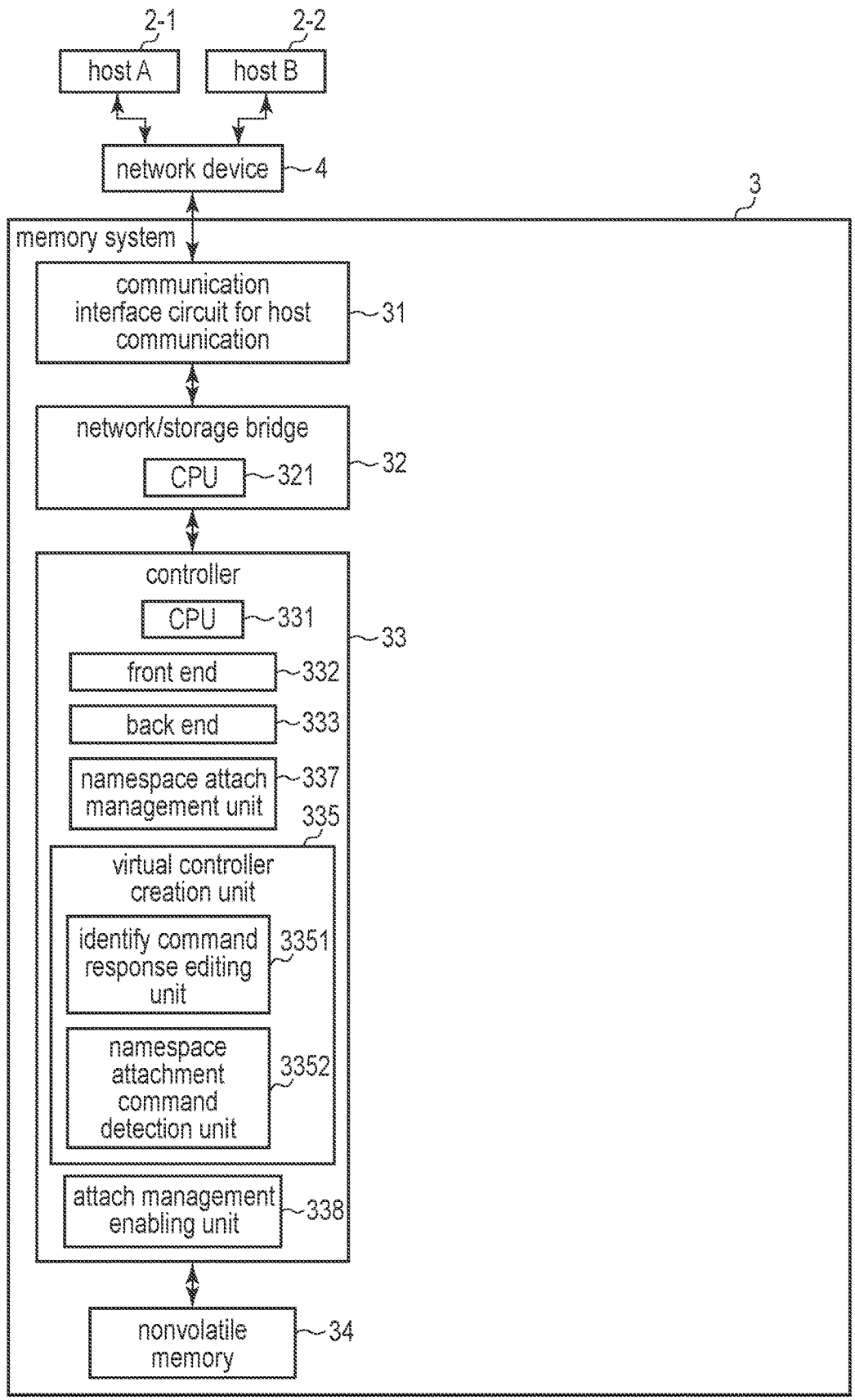
F I G. 34

MEMORY SYSTEM CONTROLLING NONVOLATILE MEMORY

CROSS-REFERENCE TO RELATED APPLICATIONS

This application is based upon and claims the benefit of priority from Japanese Patent Application No. 2022-047003, filed Mar. 23, 2022, the entire contents of which are incorporated herein by reference.

FIELD

Embodiments described herein relate generally to a memory system of controlling a nonvolatile memory.

BACKGROUND

In recent years, memory systems that control nonvolatile memories have been widely used. As such a memory system, a solid state drive (SSD) that includes a NAND flash memory is known.

Memory systems connectable to a network such as Ethernet™ have also been developed. A memory system connectable to a network can be connected to a plurality of hosts via the network.

Therefore, in a memory system connectable to a plurality of hosts, data of a certain host may be referred to or updated by another host.

Therefore, the memory system requires a technology to prevent data written by a host from being accessed by another host.

BRIEF DESCRIPTION OF THE DRAWINGS

FIG. 6 is a block diagram illustrating a third example of a configuration of the memory system according to the first embodiment.

FIG. 9 is a block diagram illustrating a fifth example of a configuration of the memory system according to the first embodiment.

FIG. 18 is a block diagram illustrating a fourth example of a configuration of the memory system according to the second embodiment.

FIG. 31 is a flowchart illustrating a procedure of a namespace detach operation performed in the memory system according to the third embodiment.

FIG. 32 is a flowchart illustrating a procedure of a disconnection operation performed in the memory system according to the third embodiment.

FIG. 33 is a block diagram illustrating a first example of a configuration of a memory system according to a fourth embodiment.

FIG. 34 is a block diagram illustrating a second example of a configuration of the memory system according to the fourth embodiment.

DETAILED DESCRIPTION

Various embodiments will be described hereinafter with reference to the accompanying drawings.

In general, according to one embodiment, a memory system comprises a nonvolatile memory, a controller, a communication interface, a virtual controller creation unit, and an access management unit. The controller is configured to control the nonvolatile memory. The virtual controller creation unit is a circuit configured to create a virtual controller based on connection of a host to the communication interface. The access management unit is a circuit configured to manage permission information. The controller manages a plurality of namespaces. Each of the plurality of namespaces is associated with a storage area of a plurality of storage areas of the nonvolatile memory. The permission information is information indicating a correspondence between each of the plurality of namespaces and a host permitted to access the namespace. The virtual controller creation unit creates, based on the permission information, a first virtual controller to which a namespace that a first host connected to the communication interface is permitted to access is attached, as a virtual controller to be used by the first host to access the nonvolatile memory.

First Embodiment

Figure 1:
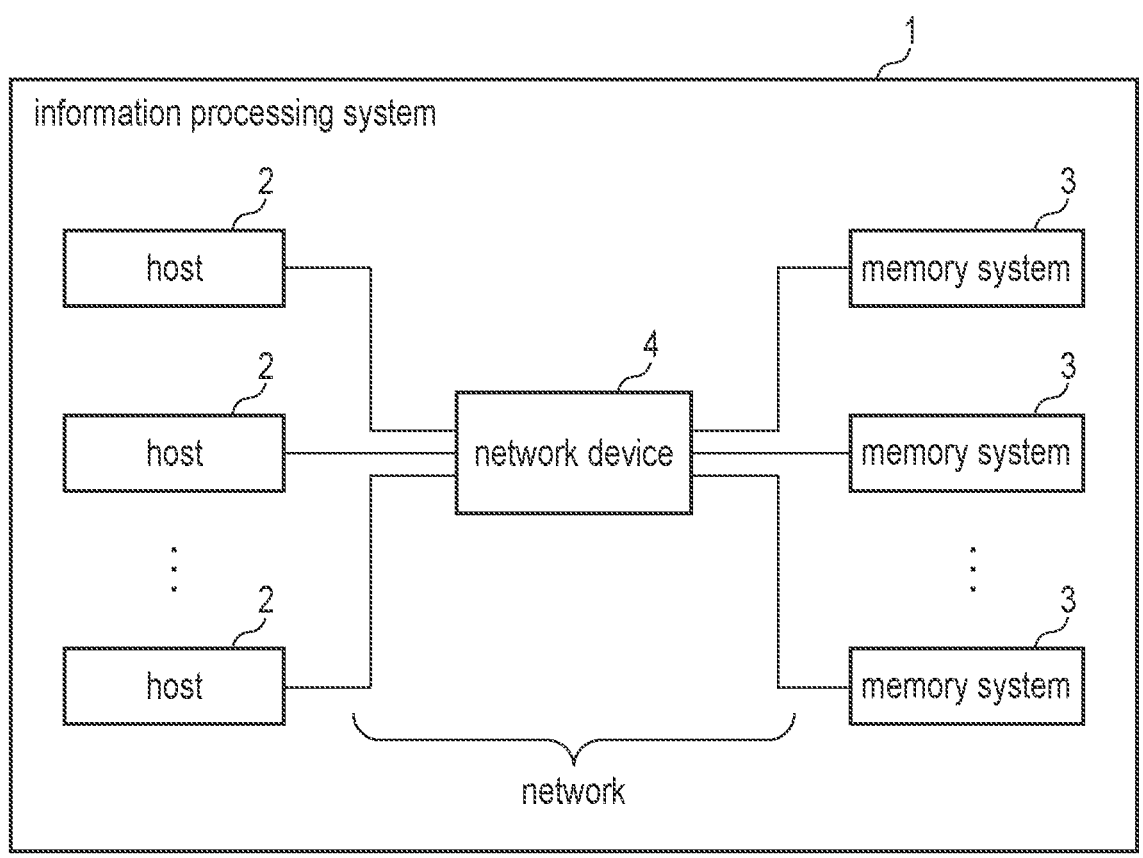
FIG. 1 is a block diagram illustrating an example of a configuration of an information processing system that includes a memory system according to a first embodiment.

A configuration of an information processing system that includes a memory system according to a first embodiment will be described. FIG. 1 is a block diagram illustrating an example of a configuration of the information processing system that includes the memory system according to the first embodiment. The information processing system 1 includes a host 2, a memory system 3, and a network device 4.

The host 2 is an information processing apparatus. The host 2 is, for example, a personal computer or a server computer. The host 2 accesses the memory system 3. Specifically, the host 2 transmits a write command, which is a command for writing data, to the memory system 3. The host 2 further transmits a read command, which is a command for reading data, to the memory system 3.

The memory system 3 is a storage device. The memory system 3 is, for example, an SSD that includes a NAND flash memory. The memory system 3 writes data into a nonvolatile memory. Then, the memory system 3 reads data from the nonvolatile memory. The memory system 3 can be accessed from a plurality of hosts 2. In addition, the memory system 3 can manage a plurality of namespaces. Each of the namespaces is associated with a storage area of a plurality of storage areas of the nonvolatile memory. Each of the namespaces is a set of consecutive logical addresses. A logical address is an address used by the host 2 to logically specify a location in a memory space of the memory system 3. As the logical address, a logical block address (LBA) can be used. The namespaces are used by the host 2 to access the memory system 3.

The host 2 and the memory system 3 can be connected via a network. The network is, for example, Ethernet. Communication between the host 2 and the memory system 3 via the network is performed via the network device 4. The network device 4 is, for example, a switch or a router. Communication between the host 2 and the memory system 3 via the network device 4 is performed in accordance with, for example, the NVM Express™ over Fabrics (NVMe-oF™) standard.

Figure 2:
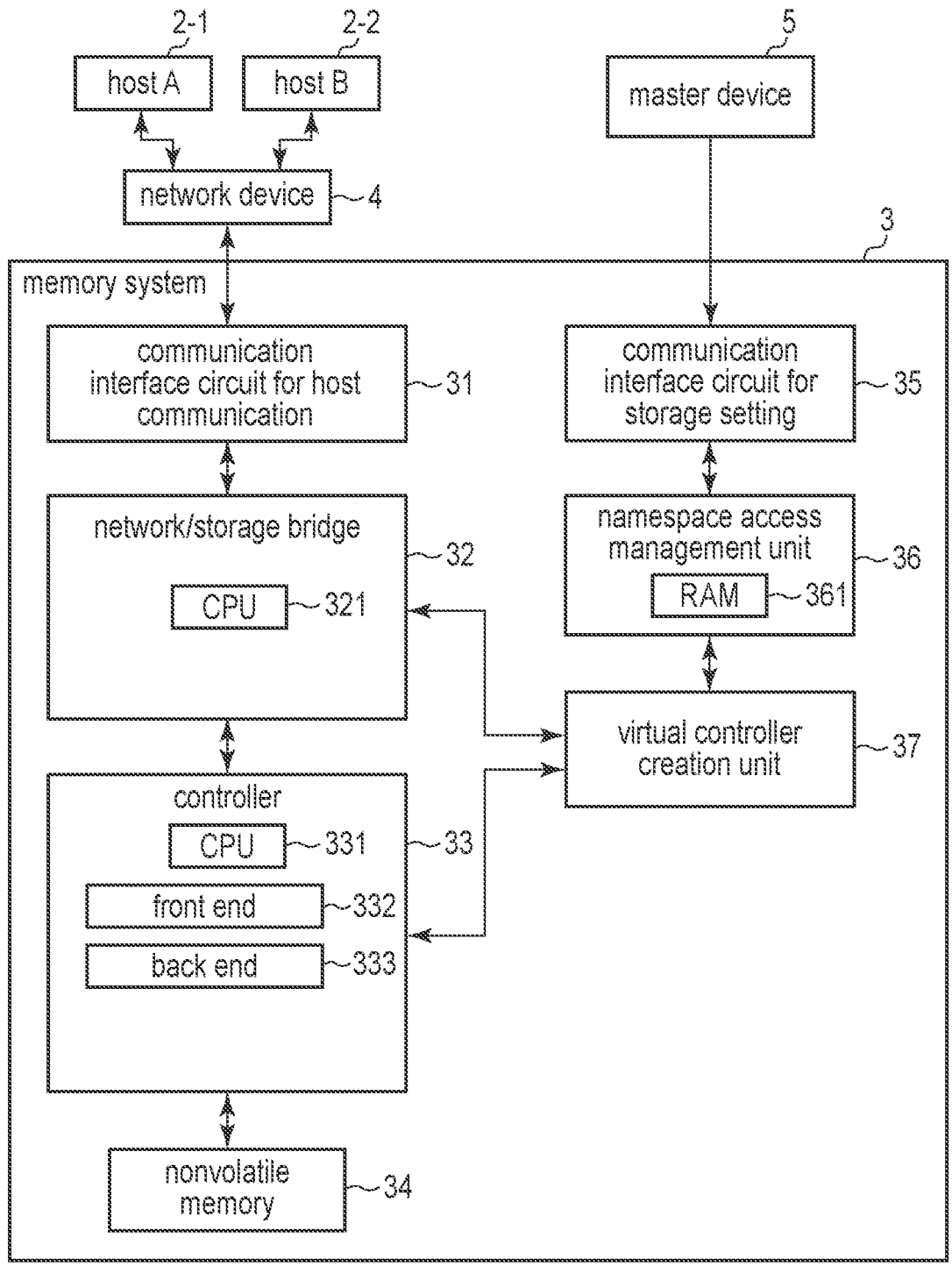
FIG. 2 is a block diagram illustrating a first example of a configuration of the memory system according to the first embodiment.

Next, a first example of a configuration of the memory system 3 according to the first embodiment will be described. FIG. 2 is a block diagram illustrating the first example of the configuration of the memory system 3 according to the first embodiment. FIG. 2 illustrates an example in which the memory system 3 is connected to two hosts 2-1 and 2-2 via the network (hereinafter, the two hosts are referred to as a host A2-1 and a host B2-2). Specifically, each of the host A2-1 and the host B2-2 is connected to the memory system 3 via the network device 4. In addition, the memory system 3 is connected to a master apparatus 5 (hereinafter, referred to as a master device). The master device 5 is, for example, a computer that manages the memory system 3.

The memory system 3 includes a communication interface circuit 31 for host communication, a network/storage bridge 32, a controller 33, a nonvolatile memory 34, a communication interface circuit 35 for storage setting, a namespace access management unit 36, and a virtual controller creation unit 37.

The communication interface circuit 31 for host communication is a communication interface. The communication interface circuit 31 for host communication is connected to each of the host A2-1 and the host B2-2 via the network. The communication interface circuit 31 for host communication receives various commands from the host A2-1 or the host B2-2. The various commands are received as packets defined by a network protocol. The various commands are, for example, input/output (I/O) commands or management commands. The I/O commands include, for example, a write command and a read command. The management commands include, for example, a connect command, a disconnect command, and a namespace attachment command. The connect command is a command to establish connection (association) with the memory system 3 via the network. The disconnect command is a command to disconnect the memory system 3. The namespace attachment command is a command to attach a namespace to the controller 33 or to detach a namespace from the controller 33. Attaching a namespace to the controller 33 means performing an operation that allows the controller 33 to access the namespace. Detaching a namespace from the controller 33 means performing an operation that prevents the controller 33 from using the namespace. The communication interface circuit 31 for host communication acquires information for identifying the host A2-1 from the host A2-1. In addition, the communication interface circuit 31 for host communication acquires information for identifying the host B2-2 from the host B2-2.

The network/storage bridge 32 is a signal conversion circuit. The network/storage bridge 32 is communicatively connected to the communication interface circuit 31 for host communication, the controller 33, and the virtual controller creation unit 37. The network/storage bridge 32 converts a network protocol signal received from the communication interface circuit 31 for host communication into a signal for the controller 33. The signal for the controller 33 is, for example, a storage protocol signal conforming to the NVMe standard. In addition, the network/storage bridge 32 converts a signal received from the controller 33 into a network protocol signal.

The controller 33 is a memory controller. The controller 33 is, for example, a control circuit such as a system-on-a-chip (SoC). The controller 33 is communicatively connected to the network/storage bridge 32, the nonvolatile memory 34, and the virtual controller creation unit 37. The controller 33 receives a command received from the host A2-1 or the host B2-2 via the network/storage bridge 32. The controller 33 writes data to the nonvolatile memory 34 and reads data from the nonvolatile memory 34.

The nonvolatile memory 34 is a nonvolatile memory. The nonvolatile memory 34 is, for example, a NAND flash memory. In addition, the nonvolatile memory 34 is, for example, a flash memory having a two-dimensional structure or a three-dimensional structure. The nonvolatile memory 34 includes a plurality of blocks. Each of the plurality of blocks is a unit for a data erase operation. The data erase operation is an operation of erasing data stored in the nonvolatile memory 34. Each of the blocks is also referred to as a physical block, an erase block, a flash block, or a memory block. Each of the blocks includes a plurality of pages. Each of the plurality of pages includes, for example, a plurality of memory cells connected to the same word line. Each of the pages is a unit for a data writing operation and a data reading operation.

The communication interface circuit 35 for storage setting is a communication interface. The communication interface circuit 35 for storage setting performs communication with the master device 5. The communication interface circuit 35 for storage setting receives an instruction from the master device 5 to the memory system 3. The instruction from the master device 5 to the memory system 3 is, for example, a vendor-specific command. In addition, the instruction from the master device 5 to the memory system 3 may be issued using a dedicated process such as Redfish or Swordfish.

The namespace access management unit 36 is a circuit that manages permission information (hereinafter, referred to as access permission information). The namespace access management unit 36 is also referred to as an access management unit. The namespace access management unit 36 generates and manages the access permission information based on the instruction received by the communication interface circuit 35 for storage setting from the master device 5. The access permission information is information indicating a correspondence between each of the namespaces and a host permitted to access the namespace by the master device 5. The namespace access management unit 36 manages a correspondence between a namespace and a host permitted to access the namespace, using the access permission information.

The virtual controller creation unit 37 is a circuit that creates a virtual controller. The virtual controller creation unit 37 creates, based on the connection of the host A2-1 to the memory system 3, a virtual controller to be provided to the host A2-1 by the controller 33 or the network/storage bridge 32. The virtual controller is a virtualized environment that simulates the operation of the controller 33. The virtual controller is used by the host A2-1 in order for the host A2-1 to access the nonvolatile memory 34. Based on the access permission information received from the namespace access management unit 36, the virtual controller creation unit 37 attaches, a namespace to the virtual controller. The namespace is a namespace that the host A2-1 is permitted to access. That is, the virtual controller creation unit 37 creates a virtual controller to which a namespace that the host A2-1 is permitted to access is attached. Here, attaching a namespace to a virtual controller means performing an operation that allows the virtual controller to access the namespace. In addition, attaching a namespace to a virtual controller is also referred to as allocating the namespace to the virtual controller or connecting the namespace to the virtual controller. The virtual controller creation unit 37 performs the same operation when the host B2-2 is connected to the memory system 3.

Next, an internal configuration of the network/storage bridge 32 will be described. The network/storage bridge 32 includes a CPU 321.

The CPU 321 is a processor. The CPU 321 performs various processes by executing a control program (firmware). The CPU 321 loads the control program (firmware) from a ROM (not illustrated) or the nonvolatile memory 34 to a RAM (not illustrated).

Next, an internal configuration of the controller 33 will be described. The controller 33 includes a CPU 331, a front end 332, and a back end 333.

The CPU 331 is a processor. The CPU 331 performs various processes by executing a control program (firmware). The CPU 331 loads the control program (firmware) from a ROM (not illustrated) or the nonvolatile memory 34 to a RAM (not illustrated). For example, the CPU 331 manages data stored in the nonvolatile memory 34 and blocks included in the nonvolatile memory 34, as a flash translation layer (FTL). The management of the data stored in the nonvolatile memory 34 is, for example, management of mapping information that is information indicating a correspondence between a logical address and a physical address. The physical address is an address indicating a physical storage location included in the nonvolatile memory 34. The management of the blocks included in the nonvolatile memory 34 is, for example, management of defective blocks (bad blocks) included in the nonvolatile memory 34, wear leveling, and garbage collection.

The front end 332 is a circuit that performs communication with the outside of the controller 33. The front end 332 performs communication with the outside of the controller 33 in accordance with, for example, a storage protocol conforming to the NVMe standard.

The back end 333 is a circuit that controls the nonvolatile memory 34.

Next, an internal configuration of the namespace access management unit 36 will be described. The namespace access management unit 36 includes a RAM 361.

The RAM 361 is a volatile memory. The RAM 361 stores access permission information. The access permission information is information indicating a correspondence between each of the namespaces managed by the memory system 3 and a host permitted to access the namespace.

Figure 3:
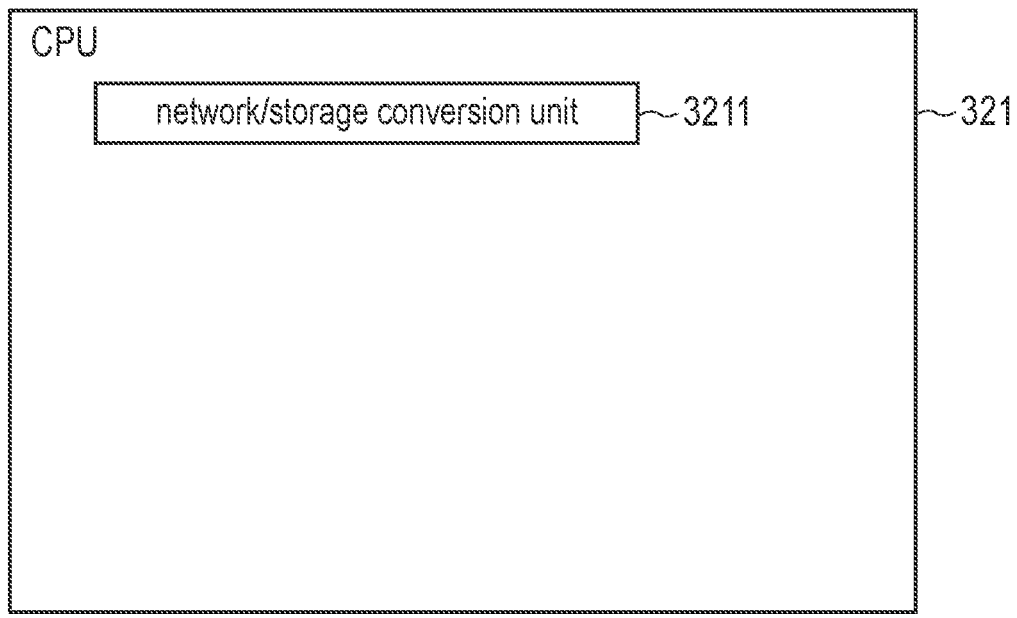
FIG. 3 is a block diagram illustrating a first example of a functional configuration of a CPU included in a bridge according to the first embodiment.

Next, a first example of a functional configuration of the CPU 321 will be described. FIG. 3 is a block diagram illustrating the first example of the functional configuration of the CPU 321 included in the network/storage bridge 32 according to the first embodiment. The CPU 321 includes a network/storage conversion unit 3211.

The network/storage conversion unit 3211 convers a network protocol to a storage protocol and converts a storage protocol to a network protocol.

Figure 4:
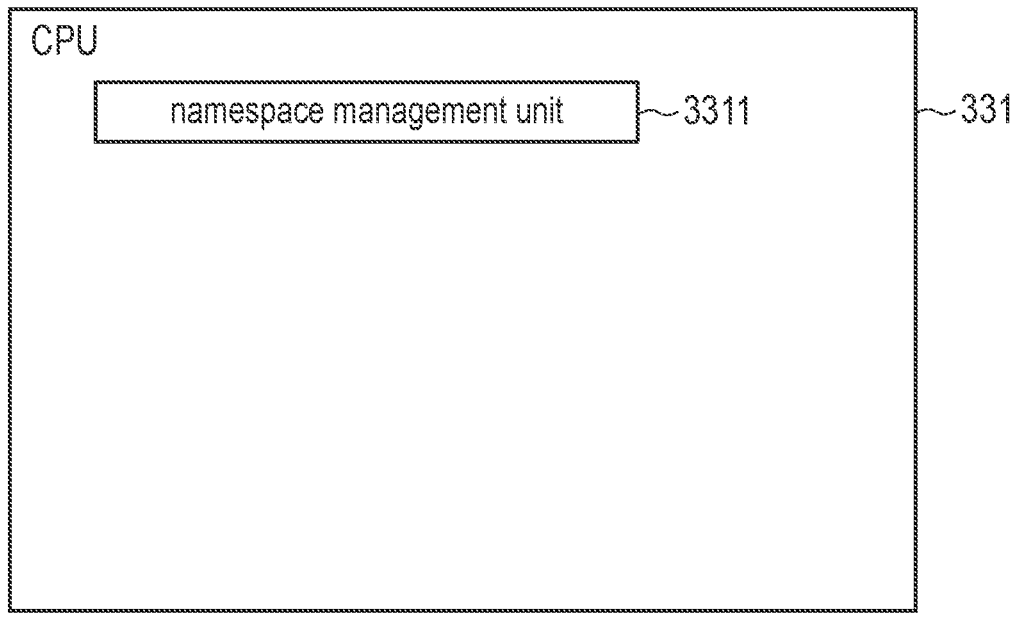
FIG. 4 is a block diagram illustrating a first example of a functional configuration of a CPU included in a controller according to the first embodiment.

Next, a first example of a functional configuration of the CPU 331 will be described. FIG. 4 is a block diagram illustrating the first example of the functional configuration of the CPU 331 included in the controller 33 according to the first embodiment. The CPU 331 includes a namespace management unit 3311.

The namespace management unit 3311 manages a plurality of namespaces. The namespace management unit 3311 creates a namespace. The namespace management unit 3311 also deletes a namespace. In addition, the namespace management unit 3311 manages the size and the identifier of a namespace.

Figure 5:
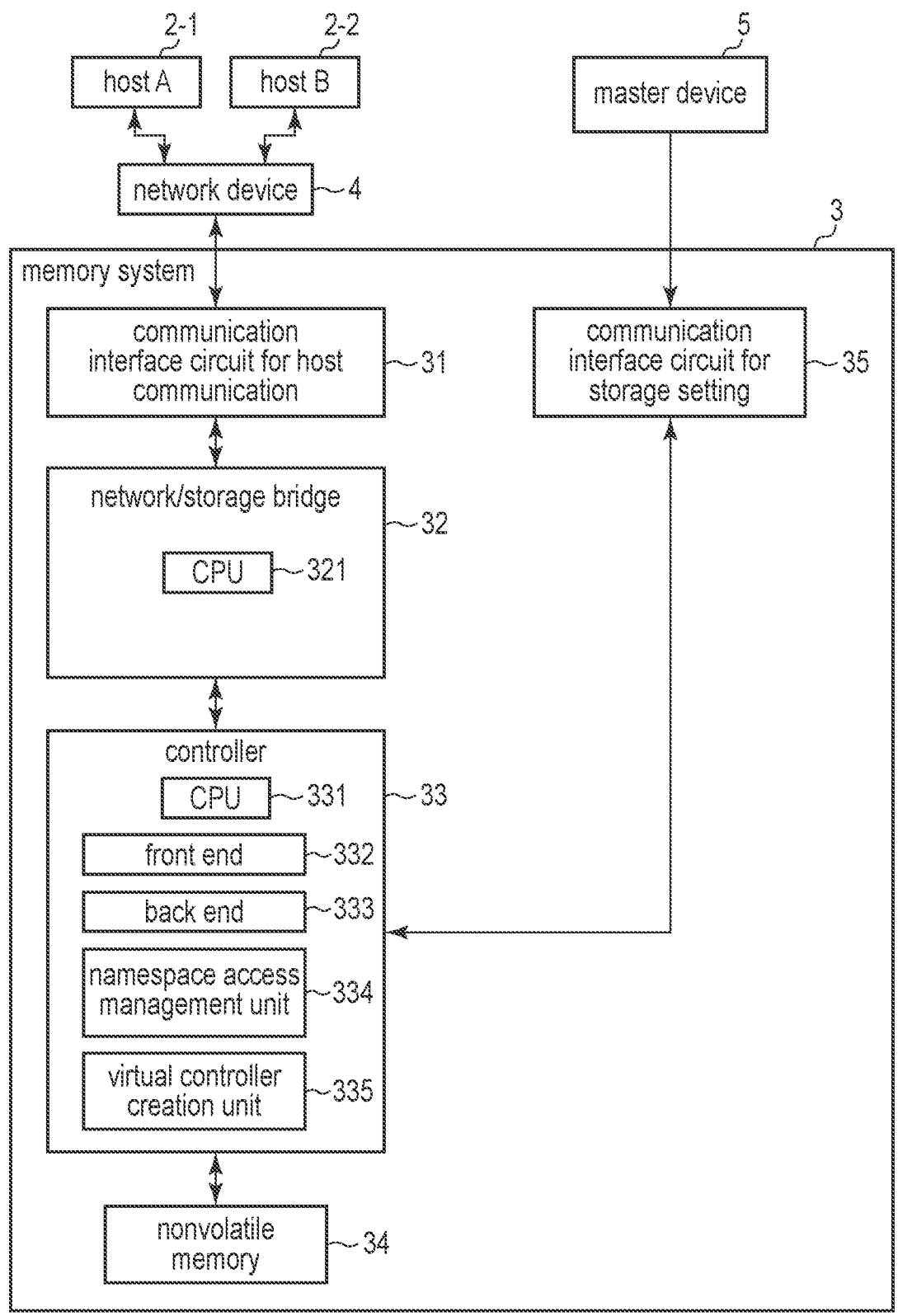
FIG. 5 is a block diagram illustrating a second example of a configuration of the memory system according to the first embodiment.

Next, a second example of a configuration of the memory system 3 according to the first embodiment will be described. In the second example of the configuration of the memory system 3, management of access to a namespace and an operation of creating a virtual controller are performed by a circuit provided in the controller 33. FIG. 5 is a block diagram illustrating the second example of the configuration of the memory system according to the first embodiment. Here, a difference from the first example of the configuration of the memory system 3 described in FIG. 2 is focused on and described.

In the second example of the configuration of the memory system according to the first embodiment, the controller 33 is communicatively connected to the communication interface circuit 35 for storage setting. In addition to the CPU 331, the front end 332, and the back end 333, the controller 33 further includes a namespace access management unit 334 and a virtual controller creation unit 335.

The namespace access management unit 334 is an access management unit that is a circuit that manages the access permission information. The operation performed by the namespace access management unit 334 is the same as the operation performed by the namespace access management unit 36.

The virtual controller creation unit 335 is a circuit that creates a virtual controller. The operation performed by the virtual controller creation unit 335 is the same as the operation performed by the virtual controller creation unit 37.

Next, a third example of a configuration of the memory system according to the first embodiment will be described. In the third example of the configuration of the memory system, the namespace access management unit 334 and the virtual controller creation unit 335 are implemented by the CPU 331 of the controller 33. FIG. 6 is a block diagram illustrating the third example of the configuration of the memory system according to the first embodiment. Here, a difference from the second example of the configuration of the memory system 3 described in FIG. 5 is focused on and described.

Figure 7:
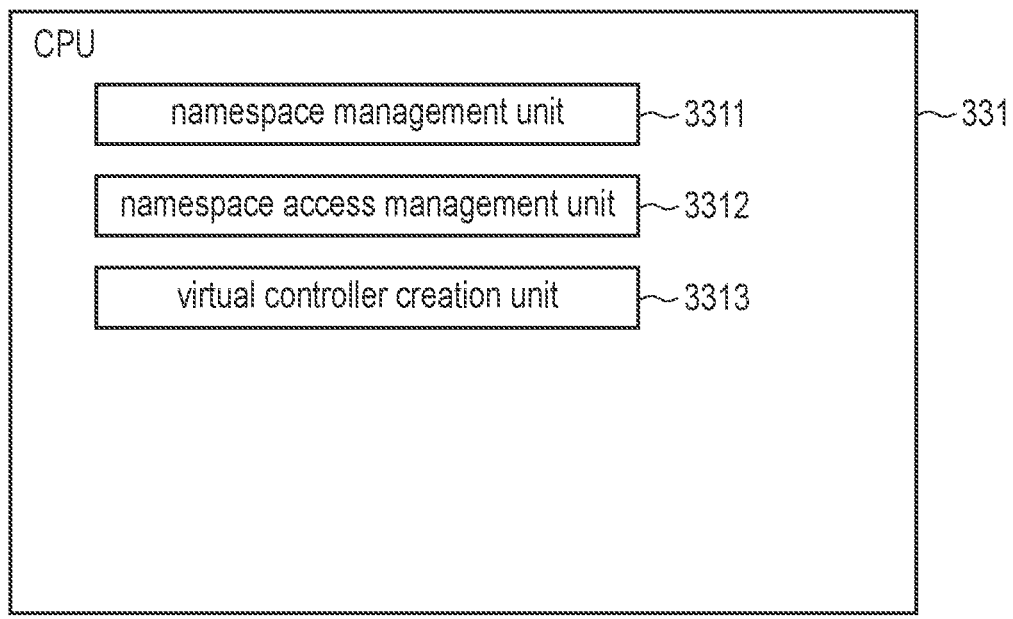
FIG. 7 is a block diagram illustrating a second example of the functional configuration of the CPU included in the controller according to the first embodiment.

Here, an example of a functional configuration of the CPU 331 in the third example of the configuration of the memory system will be described as a second example of the functional configuration of the CPU 331. FIG. 7 is a block diagram illustrating the second example of the functional configuration of the CPU 331 included in the controller 33 according to the first embodiment.

In the third example of the configuration of the memory system, the CPU 331 further includes a namespace access management unit 3312 and a virtual controller creation unit 3313 in addition to the namespace management unit 3311.

The namespace access management unit 3312 manages the access permission information. The operation performed by the namespace access management unit 3312 is similar to the operation performed by the namespace access management unit 36.

The virtual controller creation unit 3313 creates a virtual controller. The operation performed by the virtual controller creation unit 3313 is the same as the operation performed by the virtual controller creation unit 37.

Figure 8:
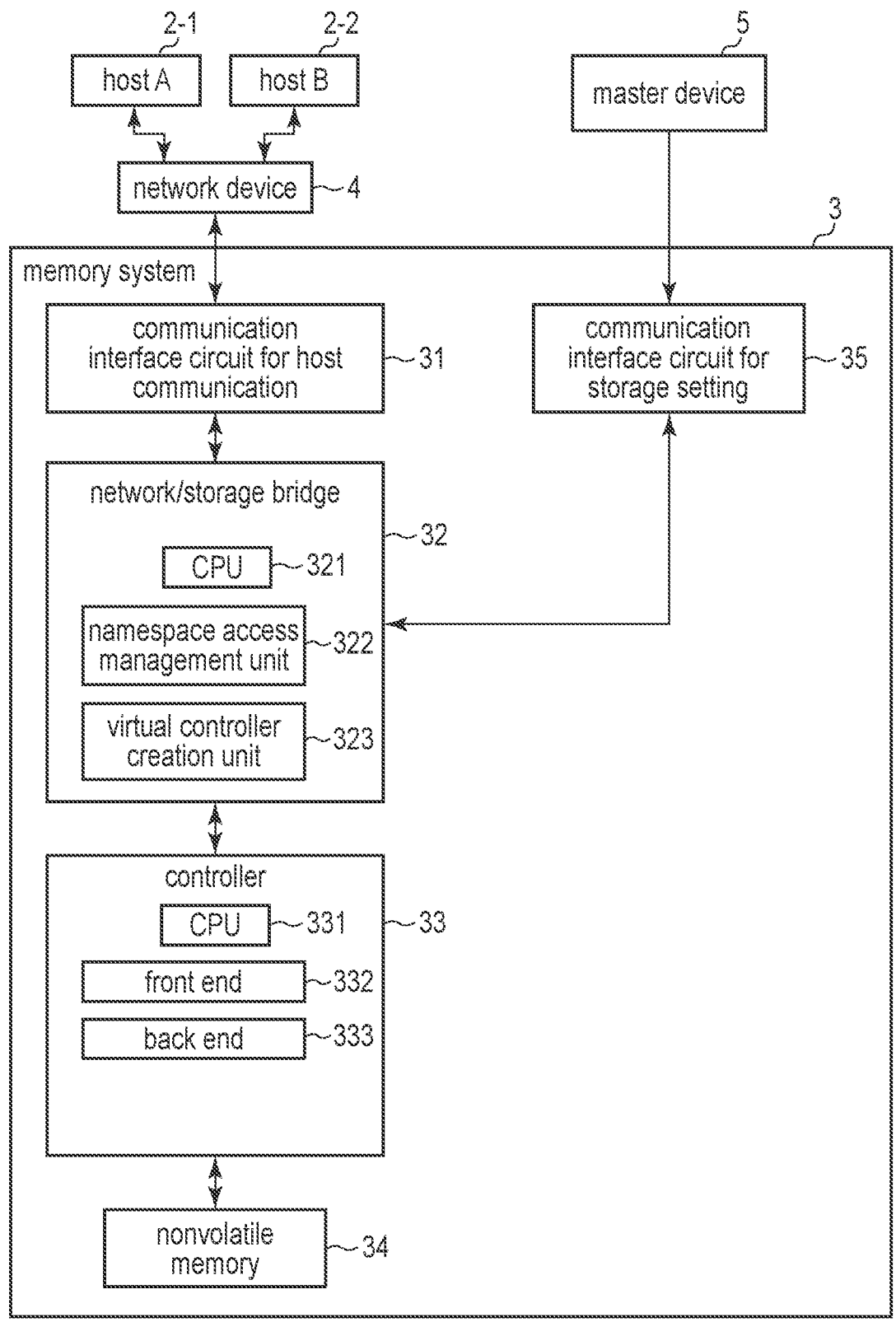
FIG. 8 is a block diagram illustrating a fourth example of a configuration of the memory system according to the first embodiment.

Next, a fourth example of a configuration of the memory system according to the first embodiment will be described. In the fourth example of the configuration of the memory system, management of access to a namespace and an operation of creating a virtual controller are performed by a circuit provided in the network/storage bridge 32. FIG. 8 is a block diagram illustrating the fourth example of the configuration of the memory system according to the first embodiment. Here, a difference from the first example of the configuration of the memory system 3 described in FIG. 2 is focused on and described.

The network/storage bridge 32 is communicatively connected to the communication interface circuit 35 for storage setting. In addition to the CPU 321, the network/storage bridge 32 further includes a namespace access management unit 322 and a virtual controller creation unit 323.

The namespace access management unit 322 is a circuit that manages the access permission information. The namespace access management unit 322 is also referred to as an access management unit. The operation performed by the namespace access management unit 322 is the same as the operation performed by the namespace access management unit 36.

The virtual controller creation unit 323 is a circuit that creates a virtual controller. The operation performed by the virtual controller creation unit 323 is the same as the operation performed by the virtual controller creation unit 37.

Next, a fifth example of a configuration of the memory system according to the first embodiment will be described. In the fifth example of the configuration of the memory system, the namespace access management unit 322 and the virtual controller creation unit 323 are implemented by the CPU 321 of the network/storage bridge 32. FIG. 9 is a block diagram illustrating the fifth example of the configuration of the memory system according to the first embodiment. Here, a difference from the third example of the configuration example of the memory system 3 described in FIG. 6 is focused on and described.

In the fifth example of the configuration the memory system 3 according to the first embodiment, the network/storage bridge 32 is communicatively connected to the communication interface circuit 35 for storage setting.

Figure 10:
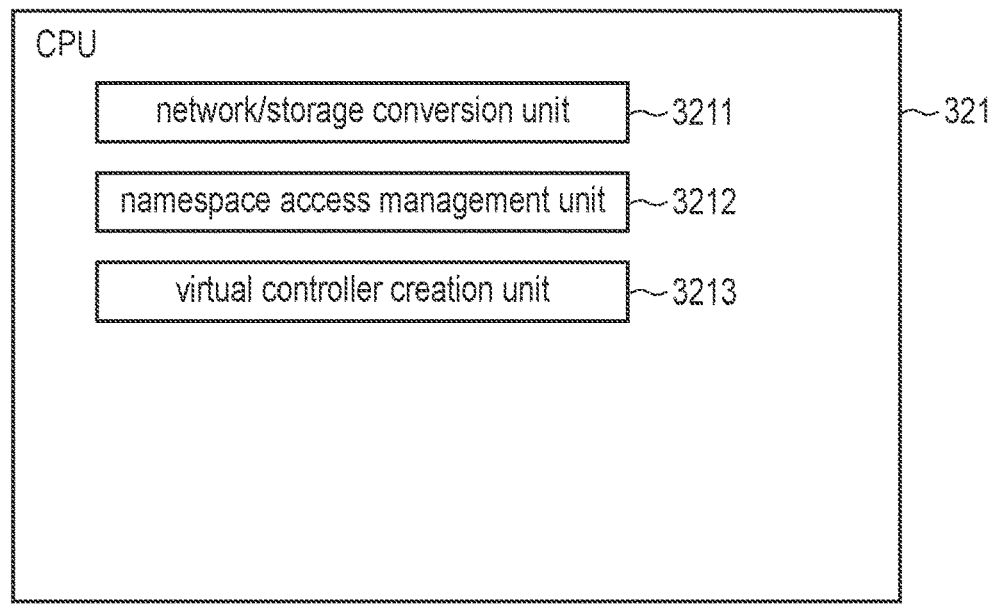
FIG. 10 is a block diagram illustrating a second example of the functional configuration of the CPU included in the bridge according to the first embodiment.

Here, an example of a functional configuration of the CPU 321 in the fifth example of the configuration of the memory system will be described as a second example of the functional configuration of the CPU included in the network/storage bridge 32 according to the first embodiment. FIG. 10 is a block diagram illustrating the second example of the functional configuration of the CPU included in the network/storage bridge 32 according to the first embodiment. Here, a difference from the first example of the functional configuration of the CPU 321 described in FIG. 3 is focused on and described.

In the fifth example of the configuration of the memory system 3, the CPU 321 further includes a namespace access management unit 3212 and a virtual controller creation unit 3213 in addition to the network/storage conversion unit 3211.

The namespace access management unit 3212 manages the access permission information. The operation performed by the namespace access management unit 3212 is the same as the operation performed by the namespace access management unit 36.

The virtual controller creation unit 3213 creates a virtual controller. The operation performed by the virtual controller creation unit 3213 is the same as the operation performed by the virtual controller creation unit 37.

Figure 11:
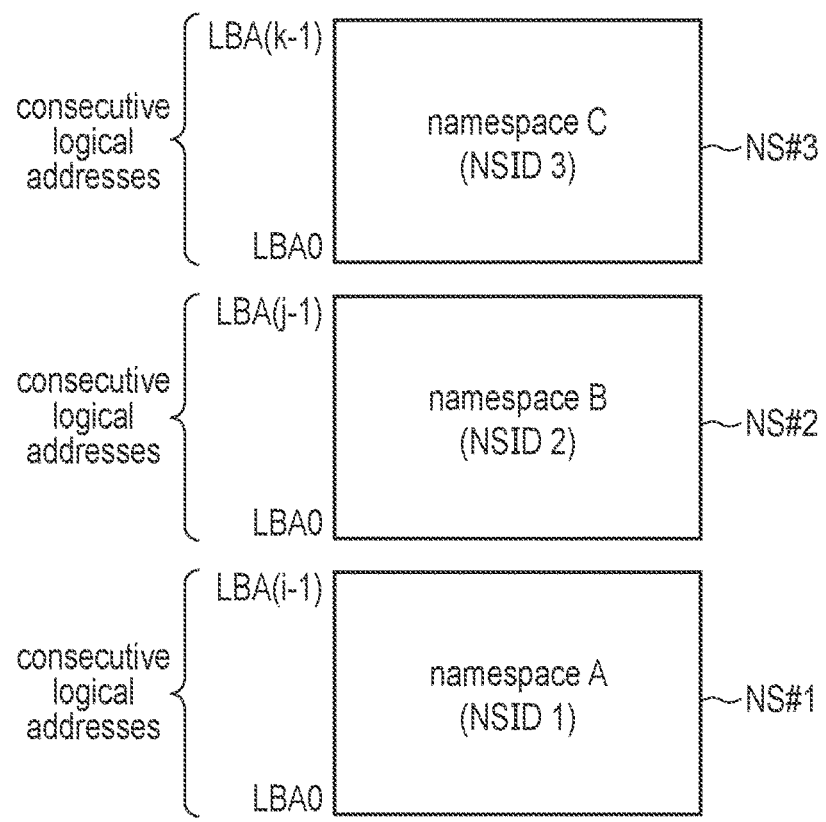
FIG. 11 is a diagram illustrating a namespace used in the memory system according to the first embodiment.

Next, a namespace used in the memory system 3 according to the first embodiment is described. FIG. 11 is a diagram illustrating a namespace used in the memory system according to the first embodiment. FIG. 11 illustrates an example in which three namespaces NS #1, NS #2, and NS #3 are used by the controller 33 of the memory system 3 (hereinafter, the namespaces are referred to as a namespace A NS #1, a namespace B NS #2, and a namespace C NS #3).

Each of the namespace A NS #1, the namespace B NS #2, and the namespace C NS #3 may be set to any size. The size of each of the namespace A NS #1, the namespace B NS #2, and the namespace C NS #3 corresponds to the number of LBAs included in the namespace. Each of the namespace A NS #1, the namespace B NS #2, and the namespace C NS #3 includes continuous logical addresses (LBA).

The namespace A NS #1 is a set of i logical addresses from LBA 0 to LBA (i−1). The namespace A NS #1 is identified by a namespace identifier (NSID 1) indicating 1.

The namespace B NS #2 is a set of j logical addresses from LBA 0 to LBA (j−1). The namespace B NS #2 is identified by a namespace identifier (NSID 2) indicating 2.

The namespace C NS #3 is a set of k logical addresses from LBA 0 to LBA (k−1). The namespace C NS #3 is identified by a namespace identifier (NSID 3) indicating 3.

Figures 12, 13:
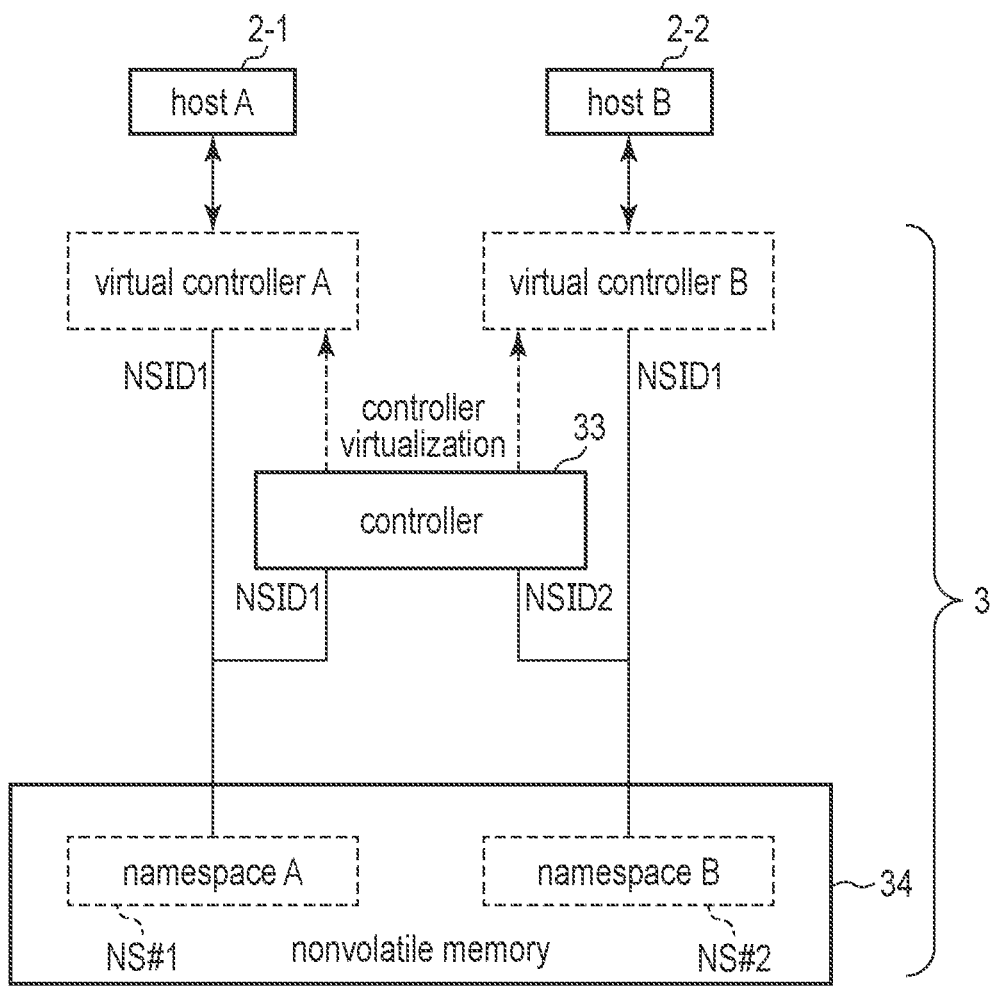
FIG. 12 is a diagram illustrating an example of a relation between a controller, a virtual controller, and a host in the memory system according to the first embodiment.
FIG. 13 is a block diagram illustrating an example of a configuration of access permission information in the memory system according to the first embodiment.

Next, an example of a relation between a controller, a virtual controller, and a host will be described. FIG. 12 is a block diagram illustrating an example of a relation between the controller, the virtual controller, and the host in the memory system 3 according to the first embodiment.

FIG. 12 illustrates an example in which the host A2-1 is permitted to access the namespace A and the host B2-2 is permitted to access the namespace B. The namespace A and the namespace B are attached to the controller 33. The controller 33 accesses the namespace A and the namespace B using the NSID 1 and the NSID 2, respectively.

The namespace that can be accessed by the host A2-1 is only the namespace A. Therefore, a virtual controller A to which only the namespace A is attached is created as a virtual controller to be used by the host A2-1 to access the nonvolatile memory 34. The namespace that can be accessed by the virtual controller A is only the namespace A. Therefore, the virtual controller A can provide the host A2-1 with only information regarding the namespace A of the two namespaces A and B attached to the controller 33. When an I/O command specifying the NSID 1 is received from the host A2-1, the virtual controller A accesses the namespace A.

The namespace that can be accessed by the host B2-2 is only the namespace B. Therefore, a virtual controller B to which only the namespace B is attached is created as a virtual controller to be used by the host B2-2 to access the nonvolatile memory 34. The namespace that can be accessed by the virtual controller B is only the namespace B. Therefore, the virtual controller B can provide the host B2-2 with only information regarding the namespace B of the two namespaces A and B attached to the controller 33. When an I/O command specifying the NSID 1 is received from the host B2-2, the virtual controller B accesses the namespace B.

Therefore, it is possible to prevent data written in the namespace A by the host A2-1 from being accessed from the host B2-2. In addition, it is possible to prevent data written in the namespace B by the host B2-2 from being accessed from the host A2-1.

Next, the access permission information managed by the namespace access management unit in the first embodiment will be described. FIG. 13 is a block diagram illustrating an example of the access permission information in the memory system according to the first embodiment.

The access permission information is information indicating a correspondence between each of the namespaces and a host permitted to access the namespace. The access permission information includes information indicating each of the namespaces of the memory system 3 and information indicating each host connected to the memory system 3. Here, the information indicating the host A2-1 is associated with the information indicating the namespace A. This indicates that the host A2-1 is permitted to access the namespace A. In addition, the information indicating the host B2-2 is associated with information corresponding to the information indicating the namespace B. This indicates that the host B2-2 is permitted to access the namespace B.

Figure 14:
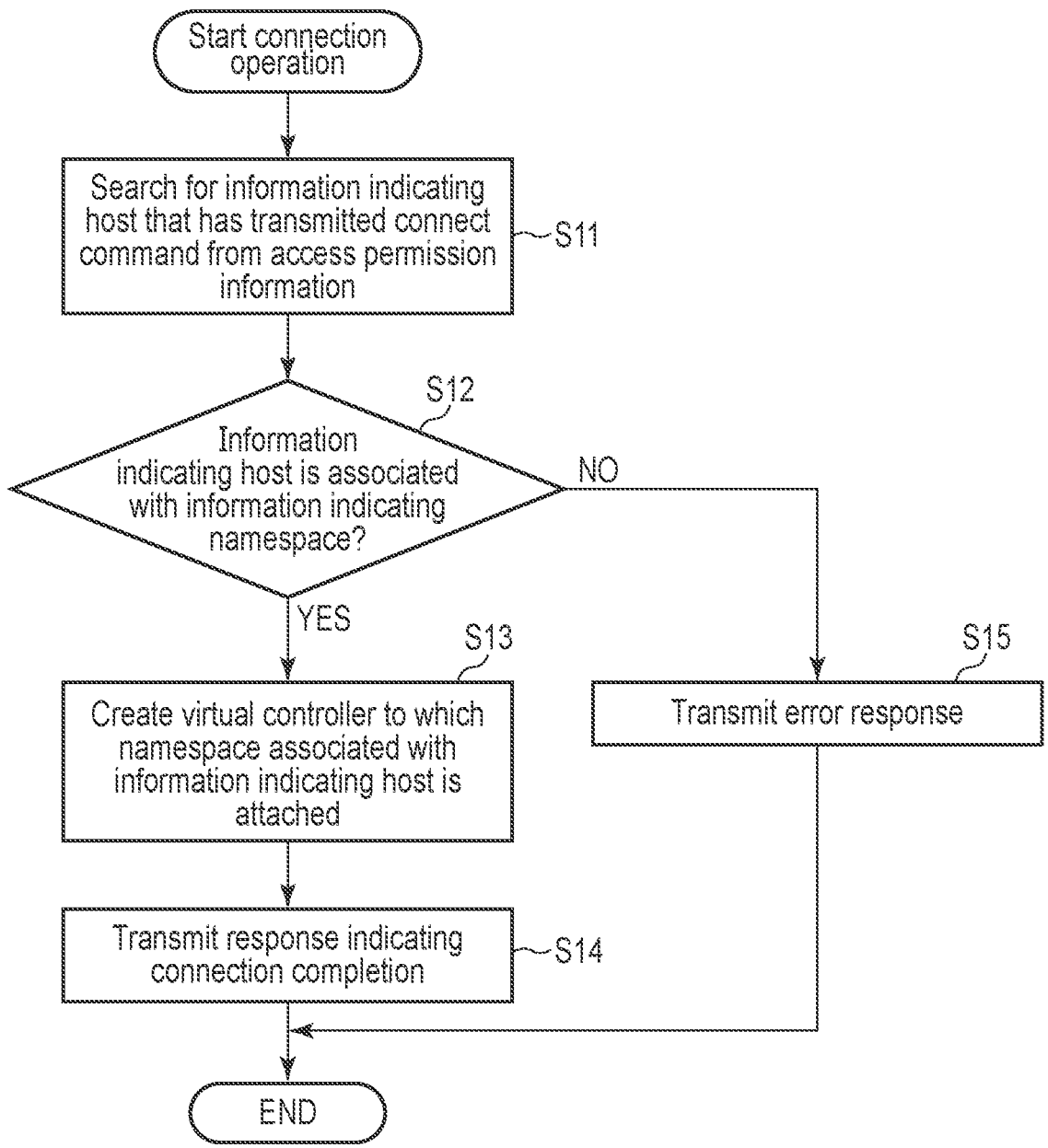
FIG. 14 is a flowchart illustrating a procedure of a connection operation performed in the memory system according to the first embodiment.

Next, a host connection operation in the memory system 3 will be described. FIG. 14 is a flowchart illustrating a procedure of a connection operation to be performed in the memory system according to the first embodiment.

When receiving a connect command from the host 2 (start), the memory system 3 searches for the information indicating the host 2 that has transmitted the connect command from the access permission information (S11).

Then, the memory system 3 determines whether the information indicating the host 2 is associated with information indicating any namespace (S12).

When the information indicating the host 2 is associated with the information indicating any namespace (Yes in S12), the memory system 3 creates a virtual controller to which the namespace associated with the information indicating the host 2 is attached, as a virtual controller to be provided to the host 2 (S13).

The memory system 3 creates a response indicating connection completion and transmits the created response to the host 2 (S14). Then, the memory system 3 terminates the series of processes in FIG. 14 (end).

When the information indicating the host 2 is not associated with information indicating any namespace (No in S12), the memory system 3 creates an error response, which is a response indicating that the host 2 is not permitted to access any namespace, and transmits the created error response to the host 2 (S15). Then, the memory system 3 terminates the series of processes in FIG. 14 (end).

As described above, according to the first embodiment, a virtual controller to which only a namespace accessible by the host 2 is attached is created based on the access permission information. The host 2 can access only the namespace attached to the virtual controller. Therefore, it is possible to prevent data written by a certain host from being accessed from another host.

Second Embodiment

Figure 15:
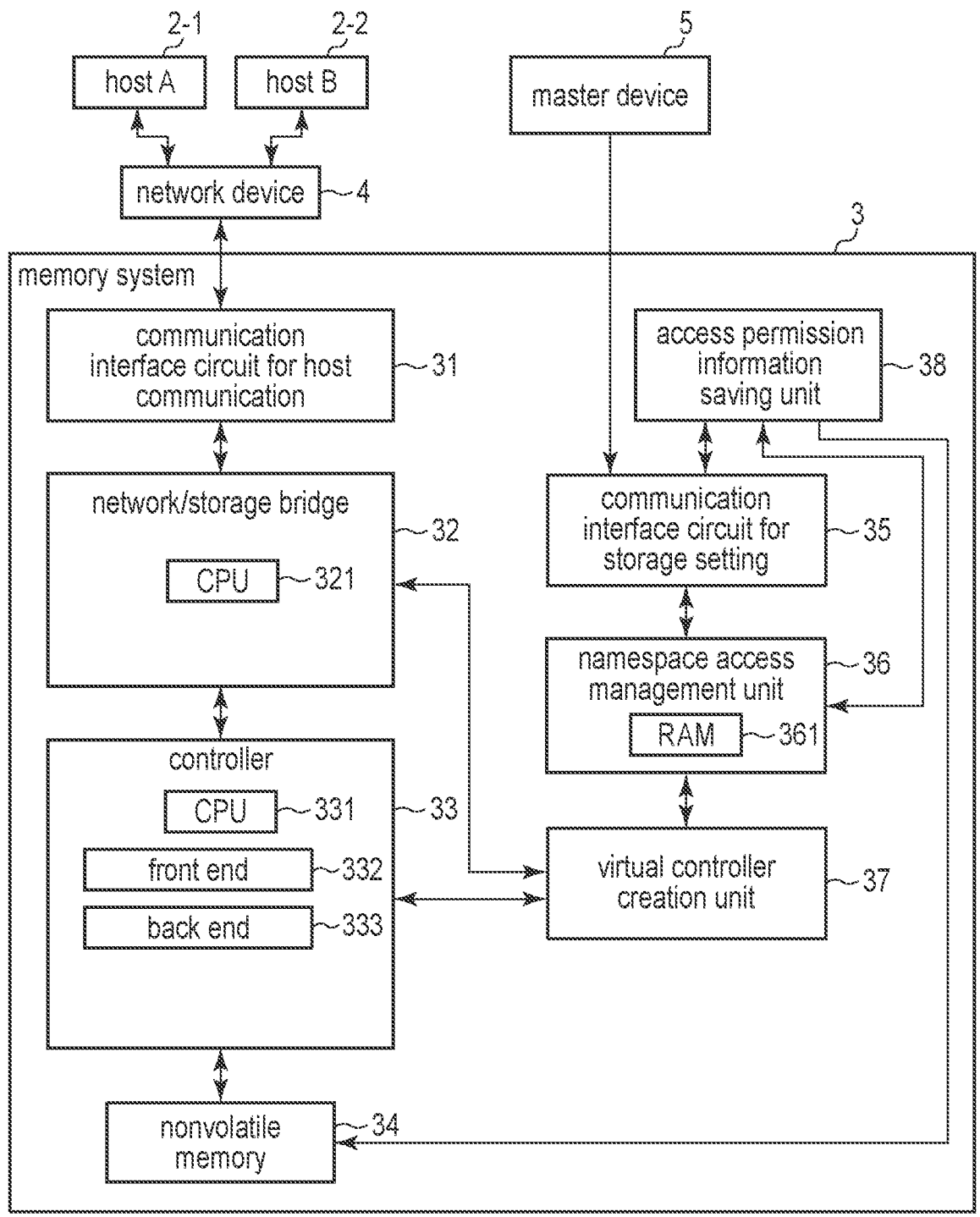
FIG. 15 is a block diagram illustrating a first example of a configuration of a memory system according to a second embodiment.

Next, a first configuration example of a memory system 3 according to a second embodiment will be described. The memory system 3 according to the second embodiment is configured to save namespace access management information into a nonvolatile memory 34. FIG. 15 is a block diagram illustrating the first example of a configuration of the memory system 3 according to the second embodiment. Here, a difference from the first configuration example of the memory system 3 according to the first embodiment described in FIG. 2 is focused on and described.

In the first example of the configuration of the memory system 3 according to the second embodiment, the memory system 3 further includes an access permission information saving unit 38. In the following, a case where the access permission information saving unit 38 is a component separated from a namespace access management unit 36 is mainly described. Note that the access permission information saving unit 38 may be provided in the namespace access management unit 36.

The access permission information saving unit 38 is a circuit that saves access permission information into the nonvolatile memory 34. The access permission information saving unit 38 refers to the access permission information managed by the namespace access management unit 36. When the access permission information is updated by the namespace access management unit 36, the access permission information saving unit 38 performs an access permission information saving operation for saving the access permission information into the nonvolatile memory 34. In addition, the access permission information saving unit 38 performs an access permission information saving operation based on the reception of an access permission information save command, which is a command for saving the access permission information, from a master device 5 via a communication interface circuit 35 for storage setting. The access permission information saved into the nonvolatile memory 34 is used to restore the access permission information before supply of a power to the memory system 3 is turned off or before the memory system 3 is reset. For example, when power is supplied to the memory system 3 or when the memory system 3 is reset, a controller 33 reads the access permission information from the nonvolatile memory 34 and transmits the read access permission information to the namespace access management unit 36. The namespace access management unit 36 stores the access permission information received from the controller 33 in a RAM 361. Then, based on the permission information stored in the RAM 361, a virtual controller creation unit 37 creates a virtual controller to which a namespace that the host 2 having transmitted a connect command is permitted to access is attached.

Figure 16:
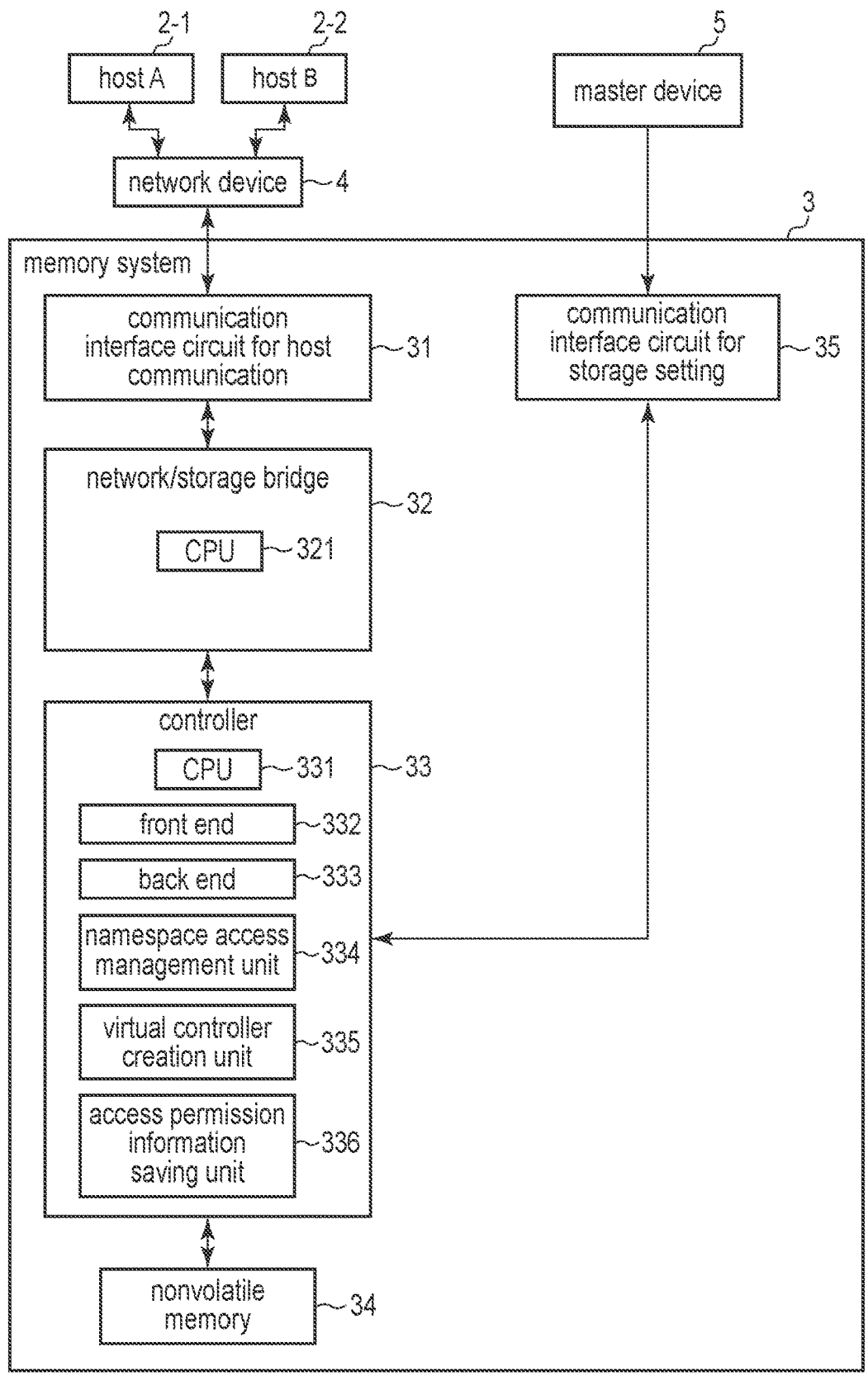
FIG. 16 is a block diagram illustrating a second example of a configuration of the memory system according to the second embodiment.

Next, a second example of a configuration of the memory system 3 according to the second embodiment will be described. In the second example of the configuration of the memory system 3, management of access to a namespace, an operation of creating a virtual controller, and an operation of saving the access permission information into the nonvolatile memory 34 are performed by a circuit provided in the controller 33. FIG. 16 is a block diagram illustrating the second example of the configuration of the memory system according to the second embodiment. Here, a difference from the second example of the configuration example of the memory system 3 according to the first embodiment described in FIG. 5 is focused on and described.

In the second example of the configuration of the memory system 3 according to the second embodiment, the controller 33 further includes an access permission information saving unit 336 in addition to a CPU 331, a front end 332, a back end 333, a namespace access management unit 334, and a virtual controller creation unit 335.

The access permission information saving unit 336 is a circuit that saves the access permission information into the nonvolatile memory 34. The operation performed by the access permission information saving unit 336 is the same as the operation performed by the access permission information saving unit 38 in the first example of the configuration of the memory system 3 according to the second embodiment.

Next, a third example of a configuration of the memory system 3 according to the second embodiment will be described. In the third example of the configuration of the memory system 3, the namespace access management unit 334, the virtual controller creation unit 335, and the access permission information saving unit 336 are implemented by a CPU 331 of the controller 33. The block diagram illustrating the third example of the configuration of the memory system 3 according to the second embodiment is the same as that in FIG. 6.

Figure 17:
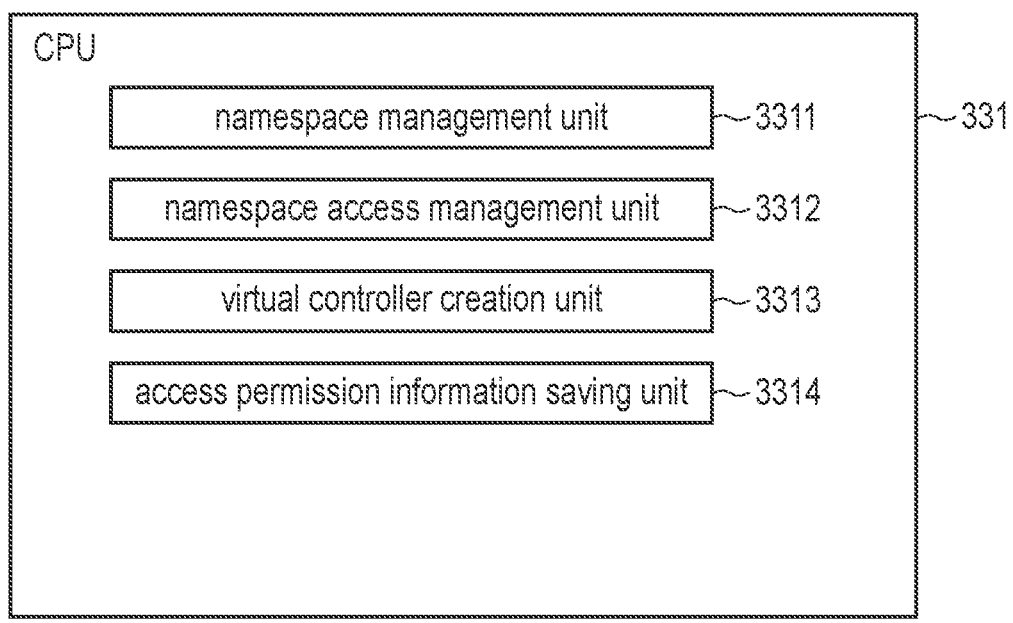
FIG. 17 is a block diagram illustrating an example of a functional configuration of a CPU included in a controller according to the second embodiment.

Here, an example of a functional configuration of the CPU 331 in the third configuration example of the memory system 3 according to the second embodiment will be described. FIG. 17 is a block diagram illustrating an example of the functional configuration of the CPU 331 included in the controller 33 according to the second embodiment. Here, a difference from the second example of the functional configuration of the CPU 331 in the third configuration example of the memory system 3 according to the first embodiment described in FIG. 7 is focused on and described.

In the third example of the configuration of the memory system 3 according to the second embodiment, the CPU 331 further includes an access permission information saving unit 3314 in addition to a namespace management unit 3311, a namespace access management unit 3312, and a virtual controller creation unit 3313.

The access permission information saving unit 3314 saves the access permission information into the nonvolatile memory 34. The operation performed by the access permission information saving unit 3314 is the same as the operation performed by the access permission information saving unit 38 in the first example of the configuration example of the memory system 3 according to the second embodiment.

Next, a fourth example of a configuration of the memory system 3 according to the second embodiment will be described. In the fourth example of the configuration of the memory system 3, management of access to a namespace, an operation of creating a virtual controller, and an operation of saving the access permission information into the nonvolatile memory 34 are performed by a circuit provided in a network/storage bridge 32. FIG. 18 is a block diagram illustrating the fourth example of the configuration of the memory system according to the second embodiment. Here, a difference from the fourth example of the configuration of the memory system 3 according to the first embodiment described in FIG. 8 is focused on and described.

In the fourth example of the configuration of the memory system 3 according to the second embodiment, the network/storage bridge 32 further includes an access permission information saving unit 324 in addition to a CPU 321, a namespace access management unit 322, and a virtual controller creation unit 323.

The access permission information saving unit 324 is a circuit that saves the access permission information into the nonvolatile memory 34. The operation performed by the access permission information saving unit 324 is the same as the operation performed by the access permission information saving unit 38 in the first example of the configuration of the memory system 3 according to the second embodiment.

Next, a fifth example of a configuration of the memory system 3 according to the second embodiment will be described. In the fifth example of the configuration of the memory system 3, the namespace access management unit 322, the virtual controller creation unit 323, and the access permission information saving unit 324 are implemented by the CPU 321 of the network/storage bridge 32. The block diagram illustrating the fifth example of the configuration of the memory system 3 according to the second embodiment is the same as that in FIG. 9.

Figure 19:
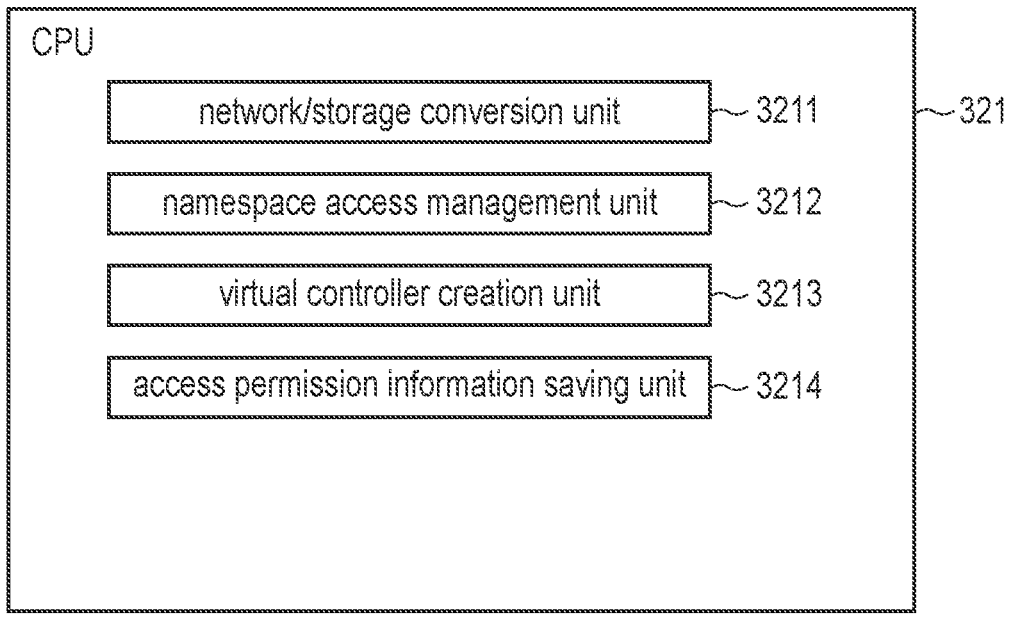
FIG. 19 is a block diagram illustrating an example of a functional configuration of a CPU included in a bridge according to the second embodiment.

Here, an example of a functional configuration of the CPU 321 in the fifth example of the configuration of the memory system 3 according to the second embodiment will be described. FIG. 19 is a block diagram illustrating an example of the functional configuration of the CPU 321 included in the network/storage bridge 32 according to the second embodiment. Here, a difference from the second example of the functional configuration of the CPU 321 in the fifth example of the configuration of the memory system 3 according to the first embodiment described in FIG. 10 is focused on and described.

In the fifth example of the configuration of the memory system 3 according to the second embodiment, the CPU 321 further includes an access permission information saving unit 3214 in addition to a network/storage conversion unit 3211, a namespace access management unit 3212, and a virtual controller creation unit 3213.

The access permission information saving unit 3214 saves the access permission information into the nonvolatile memory 34. The operation performed by the access permission information saving unit 3214 is the same as the operation performed by the access permission information saving unit 38 in the first example of the configuration of the memory system 3 according to the second embodiment.

Figure 20:
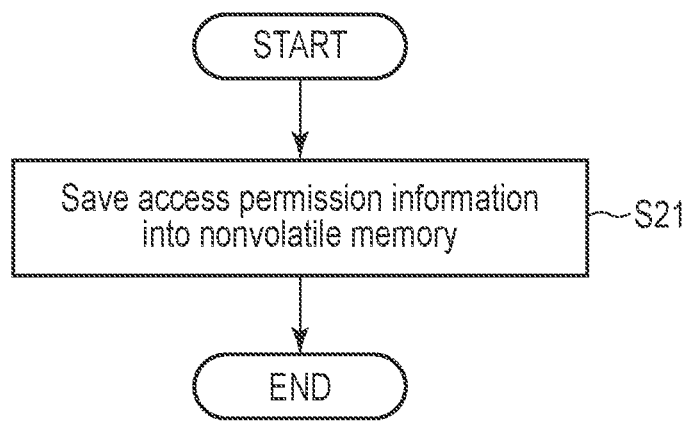
FIG. 20 is a flowchart illustrating a procedure of an access permission information saving operation performed in the memory system according to the second embodiment.

Next, an access permission information saving operation performed by the access permission information saving unit 38 in the memory system 3 according to the second embodiment will be described. FIG. 20 is a flowchart illustrating a procedure of the access permission information saving operation performed in the memory system 3 according to the second embodiment.

When the access permission information is updated or an access permission information save command is received from the master device 5 (start), the memory system 3 saves the access permission information into the nonvolatile memory 34 (S21). Then, the memory system 3 terminates the access permission information saving operation (end).

Figure 21:
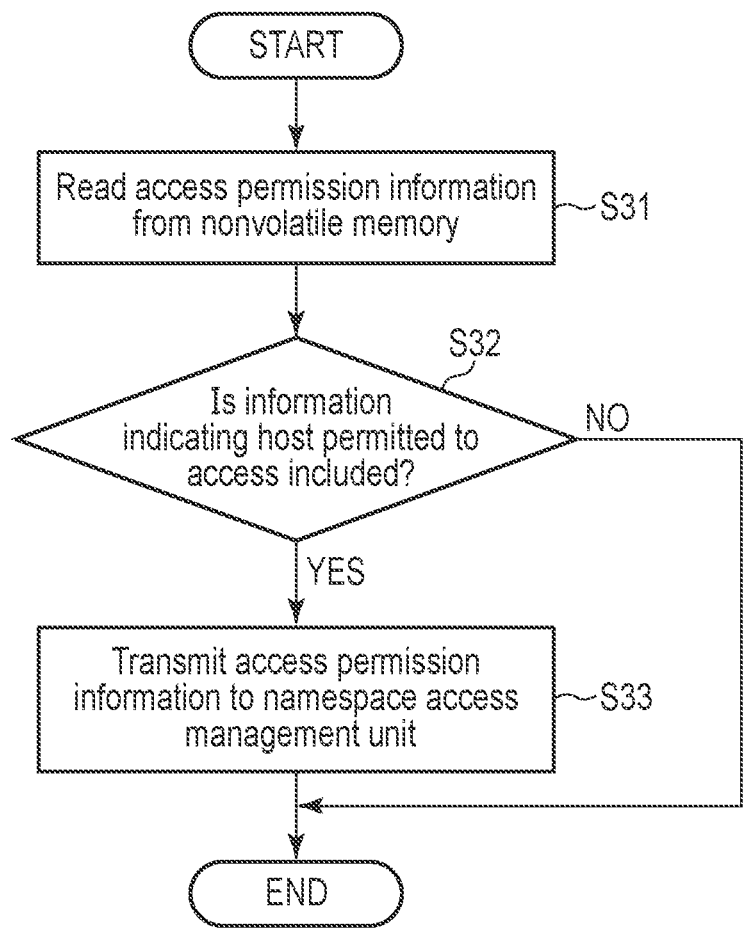
FIG. 21 is a flowchart illustrating a procedure of an access permission information setting operation performed in the memory system according to the second embodiment.

Next, an operation of reading access permission information will be described. FIG. 21 is a flowchart illustrating a procedure of the operation of reading access permission information, which is performed in the memory system 3 according to the second embodiment.

When power is supplied to the memory system 3 or when the memory system 3 is reset (start), the memory system 3 reads the access permission information from the nonvolatile memory 34 (S31). Specifically, the controller 33 reads the namespace access permission information from the nonvolatile memory 34.

The memory system 3 determines whether the read access permission information includes information indicating a host that is permitted to access any namespace (S32).

When the access permission information includes information indicating a host that is permitted to access any namespace (Yes in S32), the memory system 3 transmits the access permission information read from the nonvolatile memory 34 to the namespace access management unit 36 (or any one of the namespace access management units 322, 334, 3212, and 3312) (S33). For example, the controller 33 of the memory system 3 transmits the read access permission information to the namespace access management unit 36. The namespace access management unit 36 stores the access permission information received from the controller 33 in a RAM 361.

When the access permission information is transmitted to the namespace access management unit 36 (or any one of the namespace access management units 322, 334, 3212, and 3312) in S33, the memory system 3 terminates the processes (end).

When the access permission information does not include information indicating a host that is permitted to access any namespace (No in S32), the memory system 3 terminates the processes (end).

As described above, according to the second embodiment, the access permission information is saved into the nonvolatile memory 34. Therefore, even if supply of a power to the memory system 3 is turned off or the memory system 3 is reset, the previous access permission information can be restored. Accordingly, it is possible to shorten the downtime of the memory system 3 at the time of failure recovery or maintenance of the memory system 3.

Third Embodiment

Figure 22:
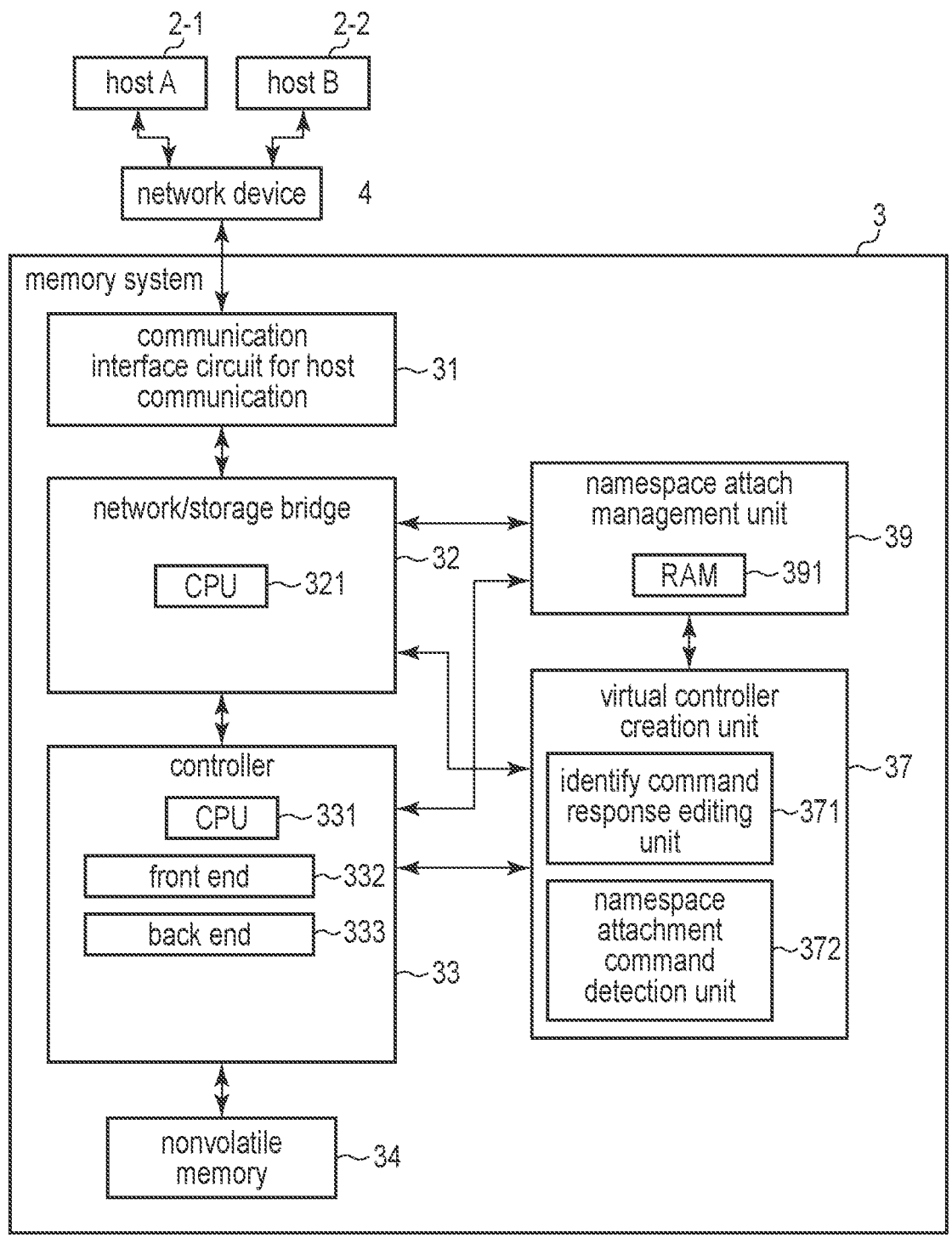
FIG. 22 is a block diagram illustrating a first example of a configuration of a memory system according to a third embodiment.

Next, a first example of a configuration of a memory system 3 according to a third embodiment will be described. The memory system 3 according to the third embodiment is configured to dynamically set a namespace which is allocated to a virtual controller provided to a host. FIG. 22 is a block diagram illustrating the first example of the configuration of the memory system 3 according to the third embodiment. Here, a difference from the first example of the configuration of the memory system 3 according to the first embodiment described in FIG. 2 is focused on and described.

In the memory system 3 according to the third embodiment, it is not necessary that a master device 5 in FIG. 2 is connected to the memory system 3. The memory system 3 does not require a communication interface circuit 35 for storage setting in FIG. 2 for connecting with the master device 5.

The memory system 3 further includes a namespace attach management unit 39 in addition to a communication interface circuit 31 for host communication, a network/ storage bridge 32, a controller 33, a nonvolatile memory 34, and a virtual controller creation unit 37.

The virtual controller creation unit 37 is a circuit that creates a virtual controller. The virtual controller creation unit 37 creates, based on the connection of a host A2-1 to the memory system 3, a virtual controller to be provided to the host A2-1. The virtual controller creation unit 37 attaches, based on attachment information received from the namespace attach management unit 39, a namespace to the virtual controller. The namespace is a namespace the host A2-1 is permitted to access. The virtual controller creation unit 37 provides the created virtual controller to the host A2-1 via the network/storage bridge 32, or via the controller 33 and the network/storage bridge 32. The virtual controller creation unit 37 performs the same operation when a host B2-2 is connected to the memory system 3.

The namespace attach management unit 39 is a circuit that manages attachment information (hereinafter, referred to as namespace attach information). The namespace attach management unit 39 is also referred to as an attach management unit. The namespace attach management unit 39 interprets a namespace attachment command received from the host A2-1 or the host B2-2. The namespace attach management unit 39 attaches, based on the received namespace attachment command, a host that has issued the namespace attachment command to a namespace. The namespace attach information is information indicating a relation between a namespace and a host attached to the namespace.

The virtual controller creation unit 37 includes an identify command response editing unit 371 and a namespace attachment command detection unit 372.

The identify command response editing unit 371 is a command response unit that transmits a response to a host. The identify command response editing unit 371 creates a response for an identify command. The identify command response editing unit 371 creates a list of namespaces included in the memory system 3 as a response for an identify command. The identify command response editing unit 371 generates information indicating a list of namespaces excluding a namespace attached to any host other than a source host of the identify command. The source host of the identify command is a host that transmits the identify command to the memory system 3. For example, the identify command response editing unit 371 excludes a namespace already attached to a host other than the source host from a list of namespaces received from the controller 33. When there is a namespace attached to both the source host of the identify command and another host, the namespace may not be excluded from the list of namespaces received from the controller 33.

The namespace attachment command detection unit 372 detects a namespace attachment command. The namespace attachment command detection unit 372 determines whether the received namespace attachment command includes information indicating attachment or information indicating detachment. When the received namespace attachment command includes information indicating attachment, the namespace attachment command detection unit 372 updates the namespace attach information such that information indicating a correspondence between the namespace specified by the namespace attachment command and the host 2 that has issued the namespace attachment command is added to the namespace attach information. When the namespace attach information is updated, the virtual controller creation unit 37 attaches, based on the updated namespace attach information, the namespace specified by the namespace attachment command to the virtual controller corresponding to the host that has issued the namespace attachment command. When the received namespace attachment command includes information indicating detachment, the namespace attachment command detection unit 372 updates the namespace attach information such that information indicating a correspondence between the namespace specified by the namespace attachment command and the host 2 that has issued the namespace attachment command is deleted from the namespace attach information. When the namespace attach information is updated, the virtual controller creation unit 37 detaches, based on the updated namespace attach information, the namespace specified by the namespace attachment command from the virtual controller corresponding to the host that has issued the namespace attachment command.

The namespace attach management unit 39 includes a RAM 391.

The RAM 391 is a volatile memory. The RAM 391 temporarily stores the namespace attach information.

Figure 23:
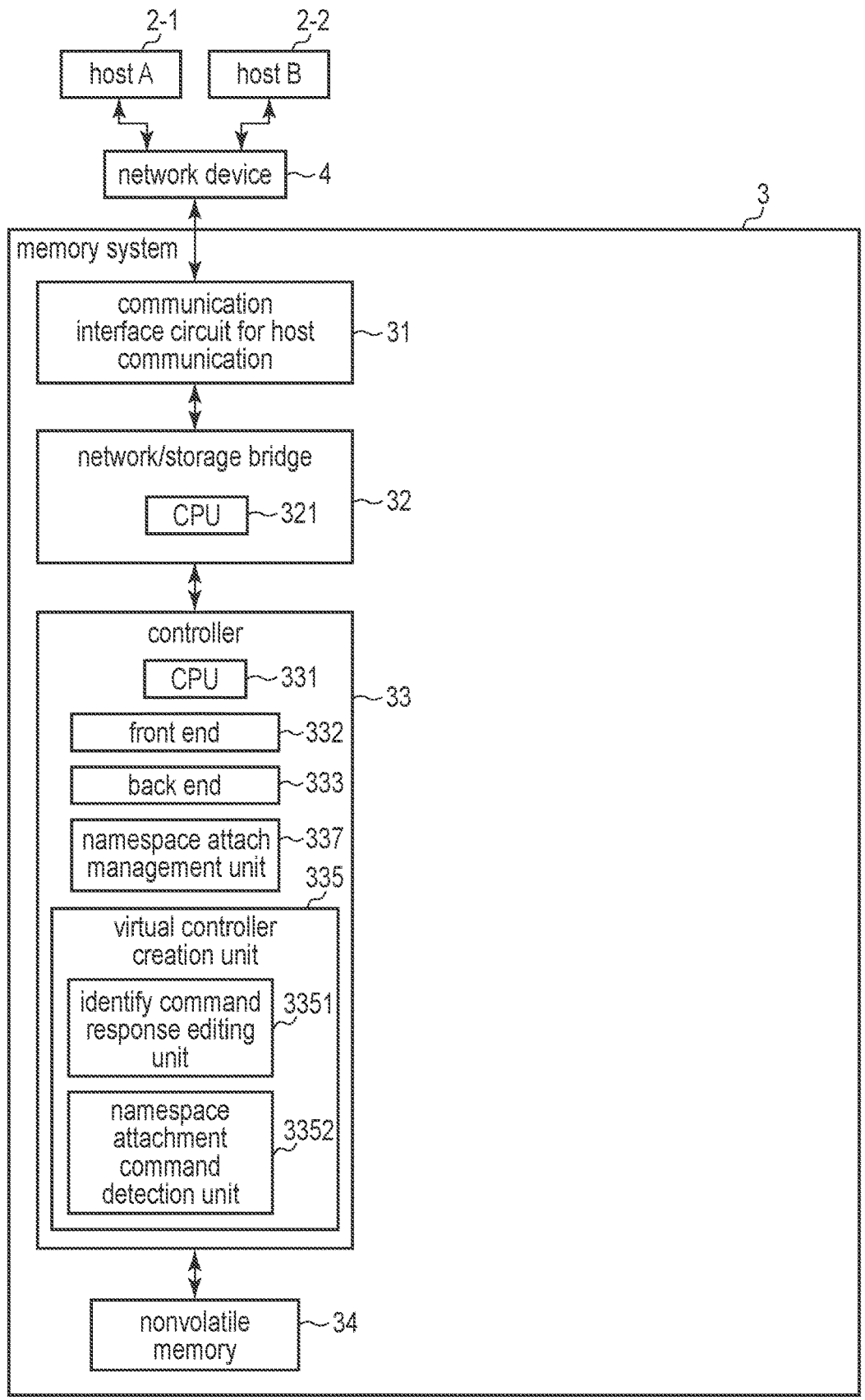
FIG. 23 is a block diagram illustrating a second example of a configuration of the memory system according to the third embodiment.

Next, a second example of a configuration of the memory system 3 according to the third embodiment will be described. In the second example of the configuration of the memory system 3, management of attachment of a namespace and an operation of creating a virtual controller are performed by a circuit provided in the controller 33. FIG. 23 is a block diagram illustrating the second example of the configuration of the memory system according to the third embodiment. Here, a difference from the first example of the configuration of the memory system 3 described in FIG. 22 is focused on and described.

The controller 33 further includes a namespace attach management unit 337 and a virtual controller creation unit 335 in addition to a CPU 331, a front end 332, and a back end 333.

The namespace attach management unit 337 is a circuit that manages the namespace attach information. The namespace attach management unit 337 is also referred to as an attach management unit. The operation performed by the namespace attach management unit 337 is the same as the operation performed by the namespace attach management unit 39 in the first example of the configuration of the memory system 3.

The virtual controller creation unit 335 is a circuit that creates a virtual controller. The operation performed by the virtual controller creation unit 335 is the same as the operation performed by the virtual controller creation unit 37 in the first example of the configuration of the memory system 3.

In addition, the virtual controller creation unit 335 includes an identify command response editing unit 3351 and a namespace attachment command detection unit 3352.

The identify command response editing unit 3351 creates a response for an identify command. The operation performed by the identify command response editing unit 3351 is the same as the operation performed by the identify command response editing unit 371 in the first example of the configuration example of the memory system 3.

The namespace attachment command detection unit 3352 detects a namespace attachment command. The operation performed by the namespace attachment command detection unit 3352 is the same as the operation performed by the namespace attachment command detection unit 372 in the first example of the configuration of the memory system 3.

Figure 24:
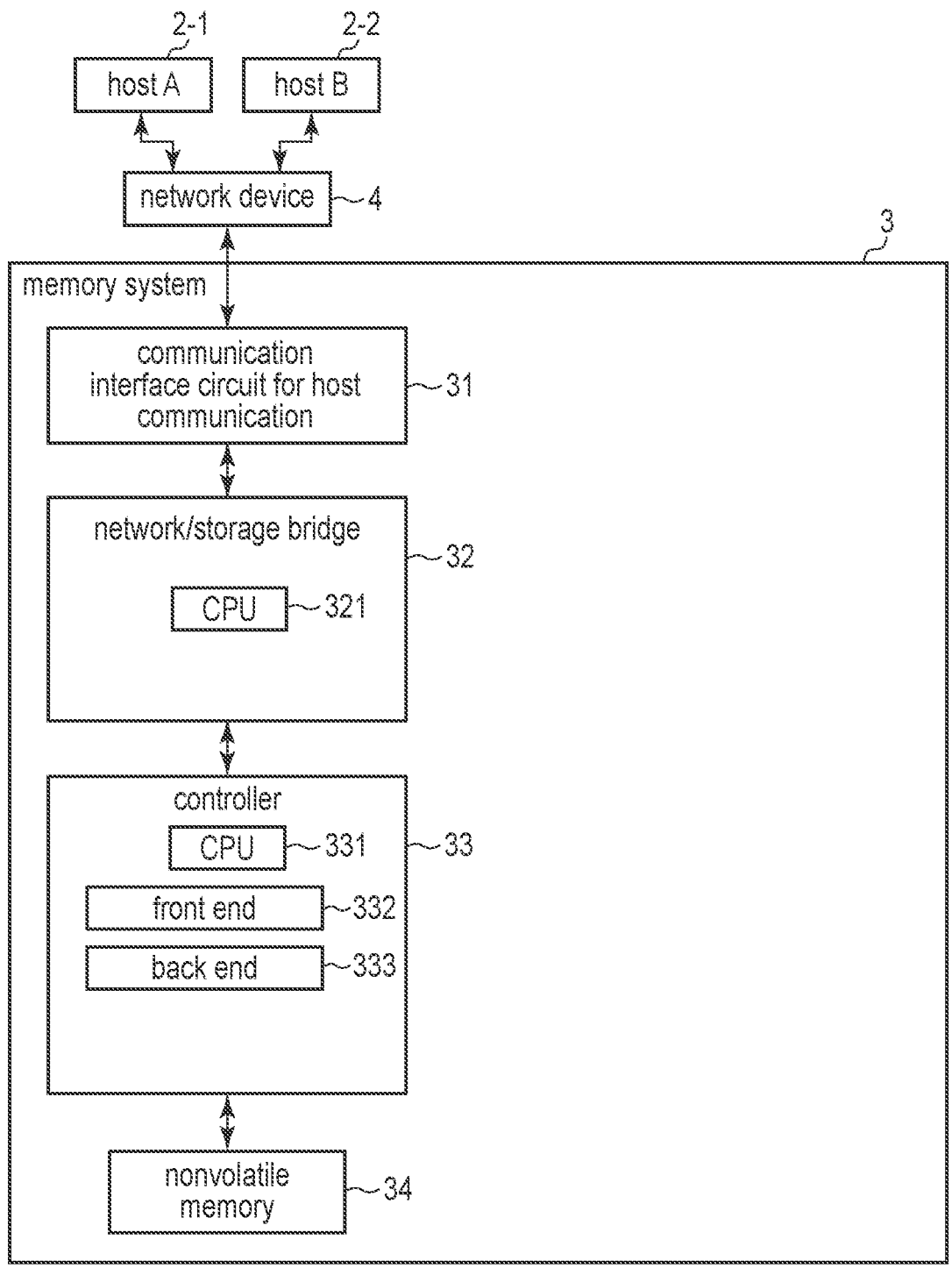
FIG. 24 is a block diagram illustrating a third example of a configuration of the memory system according to the third embodiment.

Next, a third example of a configuration of the memory system 3 according to the third embodiment will be described. In the third example of the configuration of the memory system 3, the namespace attach management unit 337 and the virtual controller creation unit 335 are implemented by the CPU 331 of the controller 33. FIG. 24 is a block diagram illustrating the third example of the configuration of the memory system according to the third embodiment. Here, a difference from the second configuration example of the memory system 3 described in FIG. 23 is focused on and described.

Figure 25:
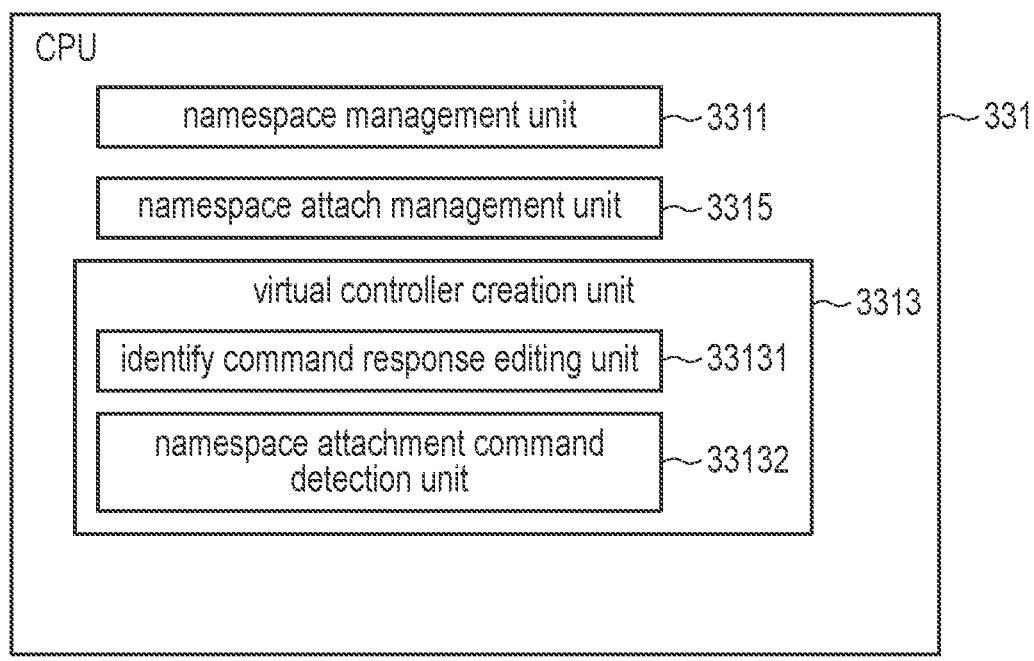
FIG. 25 is a block diagram illustrating an example of a functional configuration of a CPU included in a controller according to the third embodiment.

Here, an example of a functional configuration of the CPU 331 in the third configuration example of the memory system 3 will be described. FIG. 25 is a block diagram illustrating an example of the functional configuration of the CPU 331 included in the controller 33 according to the third embodiment.

The CPU 331 further includes a namespace attach management unit 3315 and a virtual controller creation unit 3313 in addition to a namespace management unit 3311.

The namespace attach management unit 3315 manages the namespace attach information. The operation performed by the namespace attach management unit 3315 is the same as the operation performed by the namespace attach management unit 39 in the first example of the configuration of the memory system 3.

The virtual controller creation unit 3313 creates a virtual controller. The operation performed by the virtual controller creation unit 3313 is the same as the operation performed by the virtual controller creation unit 37 in the first example of the configuration of the memory system 3.

The virtual controller creation unit 3313 includes an identify command response editing unit 33131 and a namespace attachment command detection unit 33132.

The identify command response editing unit 33131 creates a response for an identify command. The operation performed by the identify command response editing unit 33131 is the same as the operation performed by the identify command response editing unit 371 in the first example of the configuration of the memory system 3.

The namespace attachment command detection unit 33132 detects a namespace attachment command. The operation performed by the namespace attachment command detection unit 33132 is the same as the operation performed by the namespace attachment command detection unit 372 in the first example of the configuration of the memory system 3.

Figure 26:
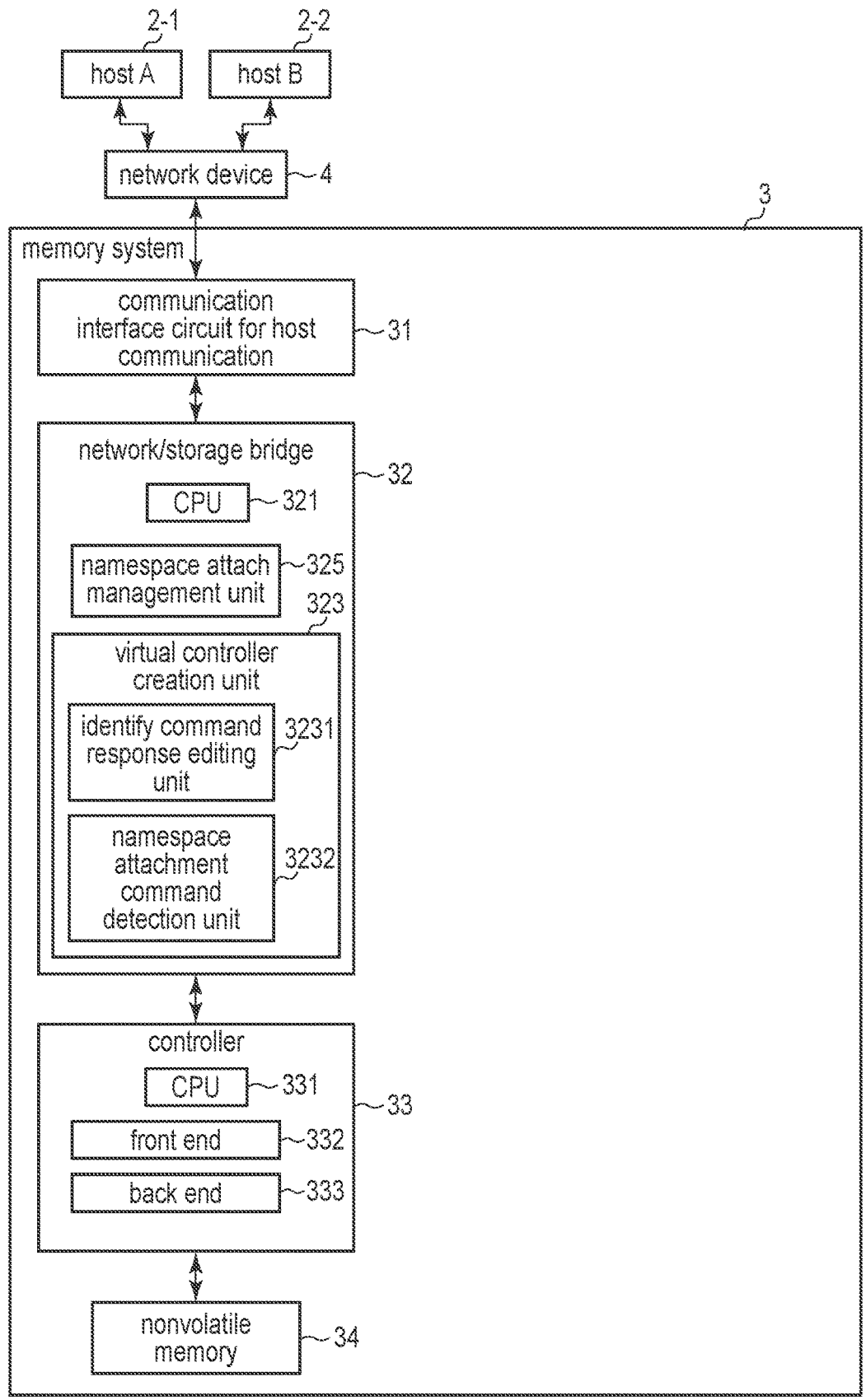
FIG. 26 is a block diagram illustrating a fourth configuration example of the memory system according to the third embodiment.

Next, a fourth example of a configuration of the memory system 3 according to the third embodiment will be described. In the fourth example of the configuration of the memory system 3, management of attachment of a namespace and an operation of creating a virtual controller are performed by a circuit provided in the network/storage bridge 32. FIG. 26 is a block diagram illustrating the fourth example of the configuration of the memory system according to the third embodiment. Here, a difference from the first example of the configuration of the memory system 3 described in FIG. 22 is focused on and will be described.

In addition to a CPU 321, the network/storage bridge 32 further includes a namespace attach management unit 325 and a virtual controller creation unit 323.

The namespace attach management unit 325 is a circuit that manages the namespace attach information. The namespace attach management unit 325 is also referred to as an attach management unit. The operation performed by the namespace attach management unit 325 is the same as the operation performed by the namespace attach management unit 39 in the first example of the configuration of the memory system 3.

The virtual controller creation unit 323 is a circuit that creates a virtual controller. The operation performed by the virtual controller creation unit 323 is the same as the operation performed by the virtual controller creation unit 37 in the first example of the configuration of the memory system 3.

The virtual controller creation unit 323 includes an identify command response editing unit 3231 and a namespace attachment command detection unit 3232.

The identify command response editing unit 3231 creates a response for an identify command. The operation performed by the identify command response editing unit 3231 is the same as the operation performed by the identify command response editing unit 371 in the first example of the configuration of the memory system 3.

The namespace attachment command detection unit 3232 detects a namespace attachment command. The operation performed by the namespace attachment command detection unit 3232 is the same as the operation performed by the namespace attachment command detection unit 372 in the first example of the configuration of the memory system 3.

Next, a fifth example of the configuration of the memory system 3 according to the third embodiment will be described. In the fifth example of the configuration of the memory system 3, the namespace attach management unit 325 and the virtual controller creation unit 323 are implemented by the CPU 321 of the network/storage bridge 32. The block diagram illustrating the fifth example of the configuration of the memory system 3 according to the third embodiment is the same as that in FIG. 24.

Figures 27, 28:
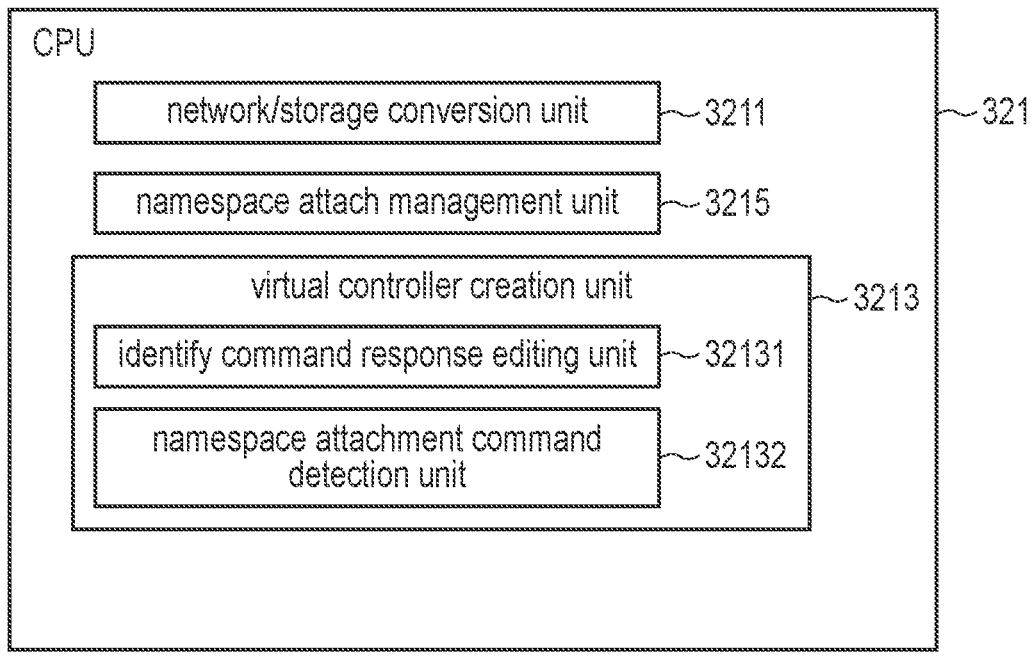
FIG. 27 is a block diagram illustrating an example of a functional configuration of a CPU included in a bridge according to the third embodiment.
FIG. 28 is a block diagram illustrating an example of namespace attach information in the memory system according to the third embodiment.

Here, an example of a functional configuration of the CPU 321 in the fifth example of the configuration of the memory system 3 will be described. FIG. 27 is a block diagram illustrating an example of the functional configuration of the CPU 321 included in the network/storage bridge 32 according to the third embodiment. Here, a difference from the first example of the functional configuration of the CPU 321 in the first example of the configuration of the memory system 3 according to the first embodiment described in FIG. 3 is focused on and will be described.

In the fifth example of the configuration of the memory system 3 according to the third embodiment, the CPU 321 further includes a namespace attach management unit 3215 and a virtual controller creation unit 3213 in addition to a network/storage conversion unit 3211.

The namespace attach management unit 3215 manages the namespace attach information. The operation performed by the namespace attach management unit 3215 is the same as the operation performed by the namespace attach management unit 39.

The virtual controller creation unit 3213 creates a virtual controller. The operation performed by the virtual controller creation unit 3213 is the same as the operation performed by the virtual controller creation unit 37 in the first example of the configuration of the memory system 3 according to the third embodiment.

The virtual controller creation unit 3213 includes an identify command response editing unit 32131 and a namespace attachment command detection unit 32132.

The identify command response editing unit 32131 creates a response for an identify command. The operation performed by the identify command response editing unit 32131 is the same as the operation performed by the identify command response editing unit 371 in the first example of the configuration of the memory system 3 according to the third embodiment.

The namespace attachment command detection unit 32132 detects a received namespace attachment command. The operation performed by the namespace attachment command detection unit 32132 is the same as the operation performed by the namespace attachment command detection unit 372 in the first example of the configuration of the memory system 3 according to the third embodiment.

Next, the namespace attach information managed by the namespace attach management unit 39 in the memory system 3 according to the third embodiment will be described. FIG. 28 is a block diagram illustrating an example of the namespace attach information according to the third embodiment.

The namespace attach information is information indicating a correspondence between each of a plurality of namespaces and a host attached to each of the namespaces. The namespace attach information includes information indicating each of the namespaces of the memory system 3 and information indicating each host connected to the memory system 3. The namespace attach information includes information indicating the host A2-1 as information corresponding to information indicating a namespace A. This indicates that the host A2-1 is attached to the namespace A. In addition, the namespace attach information includes information indicating the host B2-2 as information corresponding to information indicating a namespace B. This indicates that the host B2-2 is attached to the namespace B.

Figure 29:
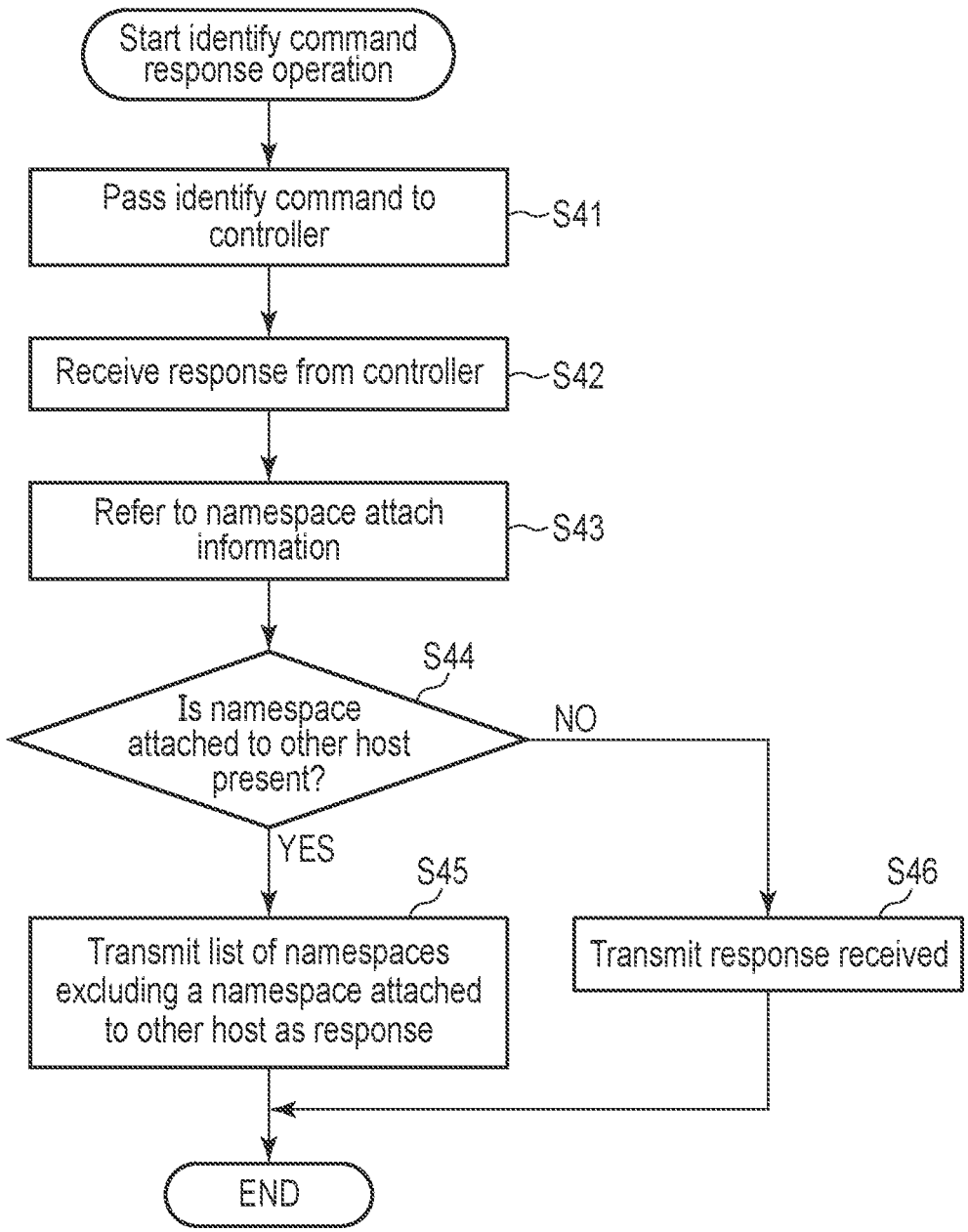
FIG. 29 is a flowchart illustrating a procedure of an operation of responding to an identify command performed in the memory system according to the third embodiment.

Next, an operation of responding to an identify command will be described. FIG. 29 is a flowchart illustrating a procedure of the operation of responding to an identify command to be performed in the memory system 3 according to the third embodiment.

When receiving an identify command (start), the memory system 3 passes the received identify command to the controller 33 (S41).

The memory system 3 receives a response for the identify command from the controller 33 (S42). The response for the identify command is a list of namespaces managed by the memory system 3.

The memory system 3 refers to the namespace attach information (S43).

The memory system 3 determines, based on the namespace attach information, whether a namespace attached to a host other than the host that has issued the identify command is present in the list of namespaces (S44).

When a namespace attached to a host other than the host that has issued the identify command is present in the list of namespaces (Yes in S44), the memory system 3 creates a list of namespaces excluding a namespace attached to a host other than the host that has issued the identify command and transmits the created list to the host 2 as a response for the identify command (S45). Then, the memory system 3 terminates the series of processes in FIG. 29 (end).

When no namespace attached to a host other than the host that has issued the identify command is present in the list of namespaces (No in S44), the memory system 3 transmits the response received in S42 (the list of namespaces managed by the memory system 3) to the host 2 (S46). Then, the memory system 3 terminates the series of processes in FIG. 29 (end).

Figure 30:
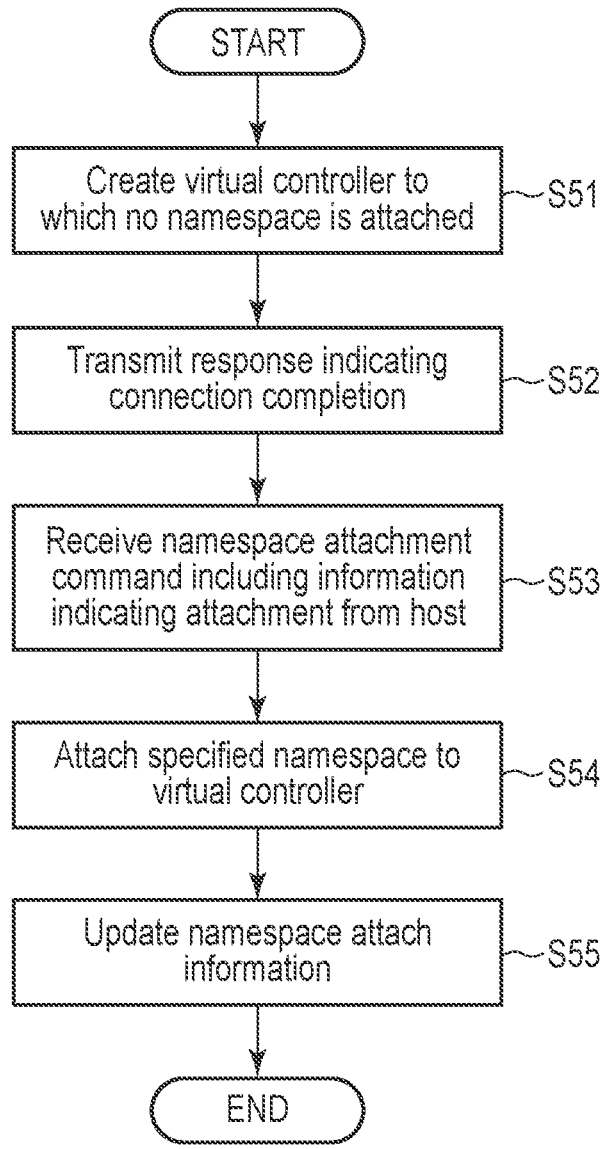
FIG. 30 is a flowchart illustrating a procedure of a connection operation performed in the memory system according to the third embodiment.

Next, a connection operation between the memory system 3 and the host 2 according to the third embodiment will be described. FIG. 30 is a flowchart illustrating a procedure of the connection operation performed in the memory system according to the third embodiment.

When receiving a connect command (start), the memory system 3 creates a virtual controller to which no namespace is attached, as a virtual controller to be provided to the host 2 that has issued the connect command (S51).

The memory system 3 creates a response indicating connection completion and transmits the created response to the host 2 (S52).

The memory system 3 receives a namespace attachment command including information indicating attachment from the host 2 (S53). The received namespace attachment command includes information specifying any namespace.

The memory system 3 attaches the namespace specified by the received namespace attachment command to the created virtual controller (S54).

The memory system 3 updates the namespace attach information in a manner such that information indicating a correspondence between the specified namespace and the host 2 that has issued the namespace attachment command is added to the namespace attach information (S55). Then, the memory system 3 terminates the series of processes in FIG. 30 (end).

Next, a namespace detach operation will be described. FIG. 31 is a flowchart illustrating a procedure of the namespace detach operation performed in the memory system according to the third embodiment.

When receiving a namespace attachment command including information indicating detachment (start), the memory system 3 determines whether the namespace specified by the namespace attachment command is attached to the corresponding virtual controller (S61). The corresponding virtual controller is a virtual controller provided to the host 2 that has issued the namespace attachment command.

When the namespace specified by the namespace attachment command is attached to the corresponding virtual controller (Yes in S61), the memory system 3 updates the namespace attach information in a manner such that information indicating a correspondence between the specified namespace and the host 2 that has issued the namespace attachment command is deleted from the namespace attach information (S62).

The memory system 3 detaches, from the virtual controller, the namespace specified by the received namespace attachment command (S63).

The memory system 3 creates a response indicating detachment completion for the host 2 and transmits the created response to the host 2 (S64). Then, the memory system 3 terminates the series of processes in FIG. 31 (end).

When the namespace specified by the namespace attachment command is not attached to the corresponding virtual controller (No in S61), the memory system 3 creates an error response that is a response indicating that an attempt to detach the namespace that has not been attached and transmits the created error response to the host 2 (S65). Then, the memory system 3 terminates the series of processes in FIG. 31 (end).

Next, a procedure of a disconnection operation will be described. FIG. 32 is a flowchart illustrating a procedure of the disconnection operation to be performed in the memory system according to the third embodiment.

When receiving a disconnect command from the host 2 (start), the memory system 3 determines whether there is a namespace attached to the corresponding virtual controller (S71). The corresponding virtual controller is a virtual controller provided to the host 2 that has issued the disconnect command.

When there is a namespace attached to the corresponding virtual controller (Yes in S71), the memory system 3 updates, for all namespaces attached to the corresponding virtual controller, the namespace attach information in a manner such that information indicating a correspondence between each namespace and the host 2 that has issued the disconnect command is deleted from the namespace attach information (S72). The memory system 3 detaches all the namespaces from the corresponding virtual controller (S73). Then, the memory system 3 terminates the disconnection operation (end).

When there is no namespace attached to the corresponding virtual controller (No in S71), the memory system 3 terminates the disconnection operation (end).

As described above, according to the third embodiment, a list of namespaces excluding a namespace attached to another host is transmitted to the host 2. Therefore, a namespace already attached to another host can be hidden from the host 2. In addition, the namespace requested to be attached from the host 2 is attached to the virtual controller. The namespace already attached to another host is hidden from the host 2. The namespace requested to be attached is a namespace other than the namespace already attached to another host. Therefore, it is possible to prevent data written by a certain host from being accessed from another host without preparing the access permission information in advance.

Fourth Embodiment

Next, a first example of a configuration a memory system 3 according to a fourth embodiment will be described. The memory system 3 according to the fourth embodiment is configured to perform an operation for setting enabling/disabling of namespace attach management. FIG. 33 is a block diagram illustrating the first example of the configuration of the memory system according to the fourth embodiment. Here, a difference from the first example of the configuration of the memory system 3 according to the third embodiment described in FIG. 22 is focused on and will be described.

The memory system 3 further includes an attach management enabling unit 40.

The attach management enabling unit 40 is a circuit that controls the operation of a namespace attach management unit 39. The attach management enabling unit 40 enables a namespace attach operation to be performed by the namespace attach management unit 39. The attach management enabling unit 40 disables a namespace attach operation to be performed by the namespace attach management unit 39. The attach management enabling unit 40 enables or disables the namespace attach management unit 39 based on an instruction from a host A2-1 or a host B2-2 received via a network/storage bridge 32. As the instruction, a set feature command, a vendor-specific NVMe command, or the like is used, for example. The attach management enabling unit 40 enables the operation of the namespace attach management unit 39 to limit information regarding namespaces to be provided by the memory system 3 to the host A2-1 and the host B2-2. In addition, the attach management enabling unit 40 disables the operation of the namespace attach management unit 39 to enable the memory system 3 to provide information regarding all namespaces to the host A2-1 and the host B2-2.

In other words, the attach management enabling unit 40 sets the memory system 3 to an attach management mode or a normal mode. The memory system 3 in the attach management mode limits information regarding namespaces to be provided to the host A2-1 and the host B2-2. The memory system 3 in the normal mode provides information regarding all namespaces to be provided to the host A2-1 and the host B2-2.

Next, a second example of the configuration of the memory system 3 according to the fourth embodiment will be described. In the second example of the configuration of the memory system 3, management of attachment of a namespace, an operation of creating a virtual controller, and setting of enabling/disabling of the management of attachment of a namespace are performed by a circuit provided in a controller 33. FIG. 34 is a block diagram illustrating the second example of the configuration of the memory system according to the fourth embodiment. Here, a difference from the second configuration example of the memory system 3 according to the third embodiment described in FIG. 23 is focused on and will be described.

The controller 33 further includes an attach management enabling unit 338.

The attach management enabling unit 338 is a circuit that controls the operation of a namespace attach management unit 337. The operation performed by the attach management enabling unit 338 is the same as the operation performed by the attach management enabling unit 40 in the first example of the configuration of the memory system 3 according to the fourth embodiment.

Next, a third example of the configuration of the memory system 3 according to the fourth embodiment will be described. In the third example of the configuration of the memory system 3, the namespace attach management unit 337, a virtual controller creation unit 335, and the attach management enabling unit 338 are implemented by a CPU 331 of the controller 33. The block diagram illustrating the third example of the configuration of the memory system 3 according to the fourth embodiment is the same as that in FIG. 24.

Figure 35:
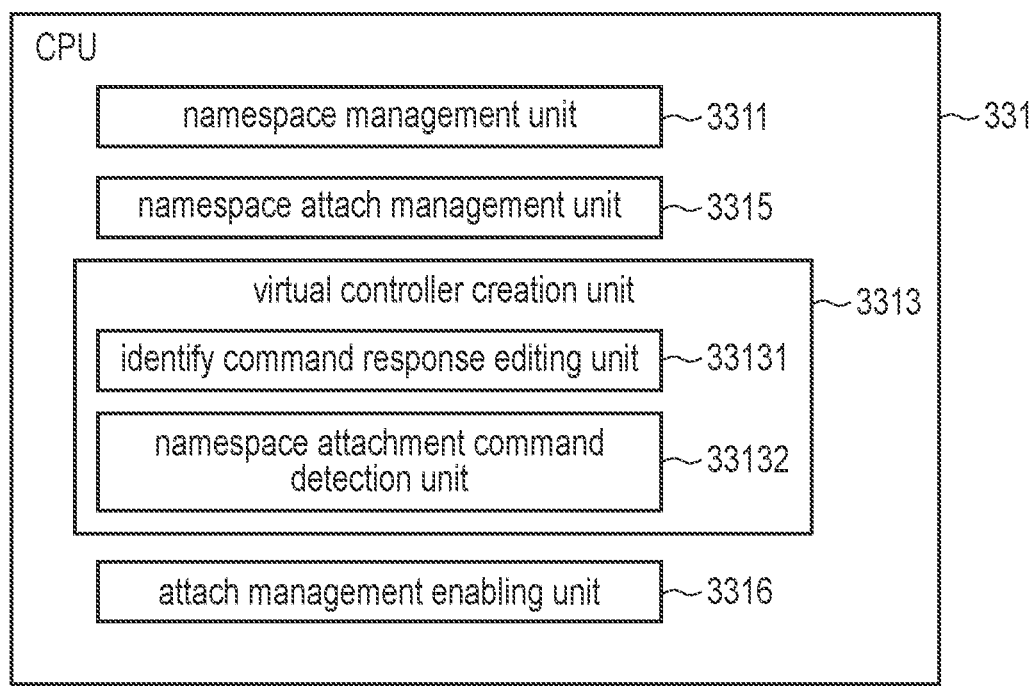
FIG. 35 is a block diagram illustrating an example of a functional configuration of a CPU included in a controller according to the fourth embodiment.

Here, an example of a functional configuration of the CPU 331 in the third configuration example of the memory system 3 will be described. FIG. 35 is a block diagram illustrating an example of the functional configuration of the CPU 331 included in the controller 33 in the third example of the configuration of the memory system 3 according to the fourth embodiment. Here, a difference from the example of the functional configuration of the CPU 331 in the third example of the configuration of the memory system 3 according to the third embodiment described in FIG. 25 is focused on and will be described.

The CPU 331 further includes an attach management enabling unit 3316.

The attach management enabling unit 3316 controls the operation of a namespace attach management unit 3315. The operation performed by the attach management enabling unit 3316 is the same as the operation performed by the attach management enabling unit 40 in the first example of the configuration of the memory system 3 according to the fourth embodiment.

Figure 36:
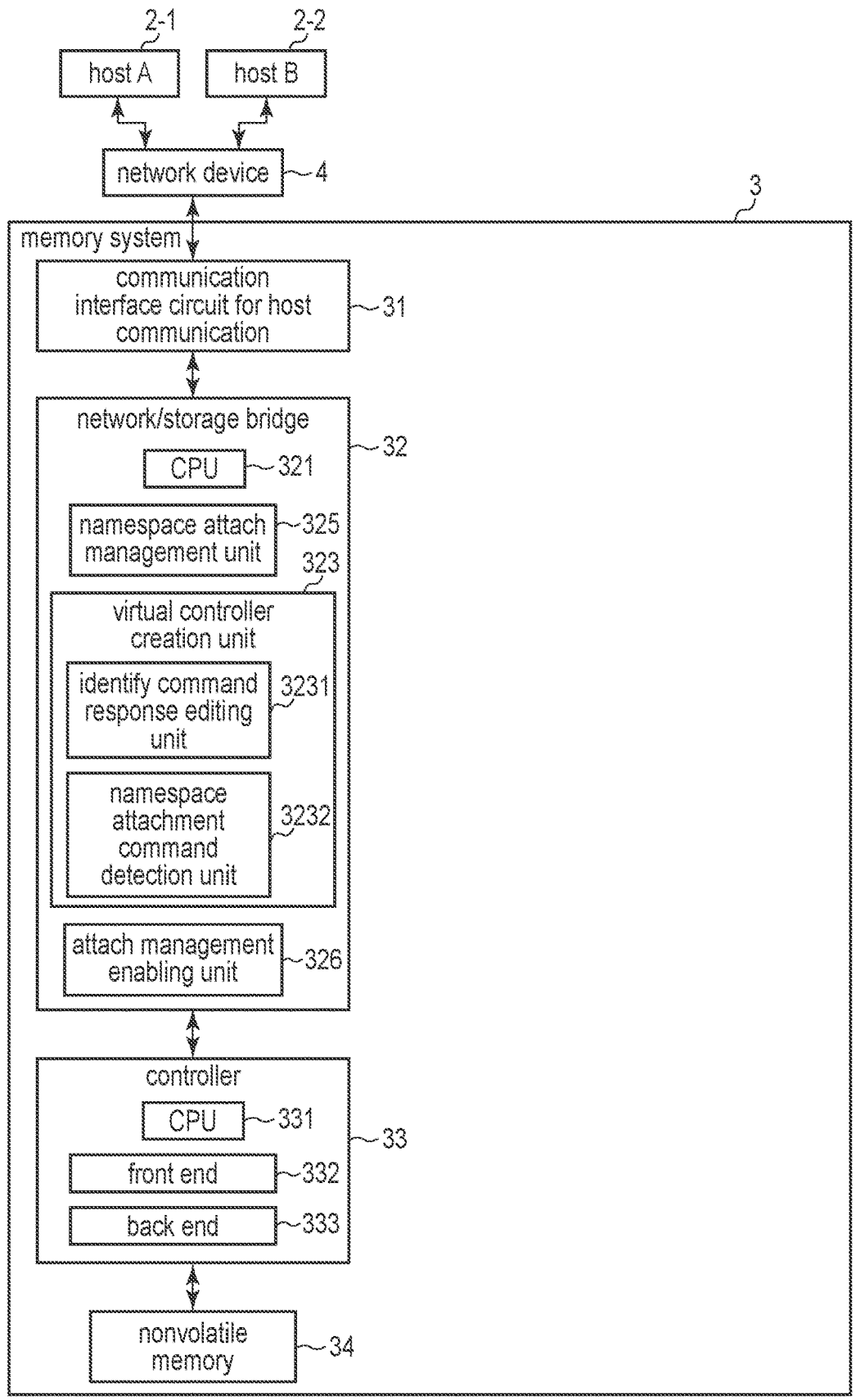
FIG. 36 is a block diagram illustrating a third example of a configuration of the memory system according to the fourth embodiment.

Next, a fourth example of the configuration of the memory system 3 according to the fourth embodiment will be described. In the fourth example of the configuration of the memory system 3, management of attachment of a namespace, an operation of creating a virtual controller, and setting of enabling/disabling of the management of attachment of a namespace are performed by a circuit provided in a network/storage bridge 32. FIG. 36 is a block diagram illustrating the fourth example of the configuration of the memory system 3 according to the fourth embodiment. Here, a difference from the fourth example of the configuration of the memory system 3 according to the third embodiment described in FIG. 26 is focused on and will be described.

The network/storage bridge 32 further includes an attach management enabling unit 326.

The attach management enabling unit 326 is a circuit that controls the operation of a namespace attach management unit 325. The operation performed by the attach management enabling unit 326 is the same as the operation performed by the attach management enabling unit 40 in the first example of the configuration of the memory system 3 according to the fourth embodiment.

Next, a fifth example of the configuration of the memory system 3 according to the fourth embodiment will be described. In the fifth example of the configuration of the memory system 3, the namespace attach management unit 325, a virtual controller creation unit 323, and the attach management enabling unit 326 are implemented by a CPU 321 of the network/storage bridge 32. The block diagram illustrating the fifth example of the configuration of the memory system 3 according to the fourth embodiment is the same as that in FIG. 24.

Figure 37:
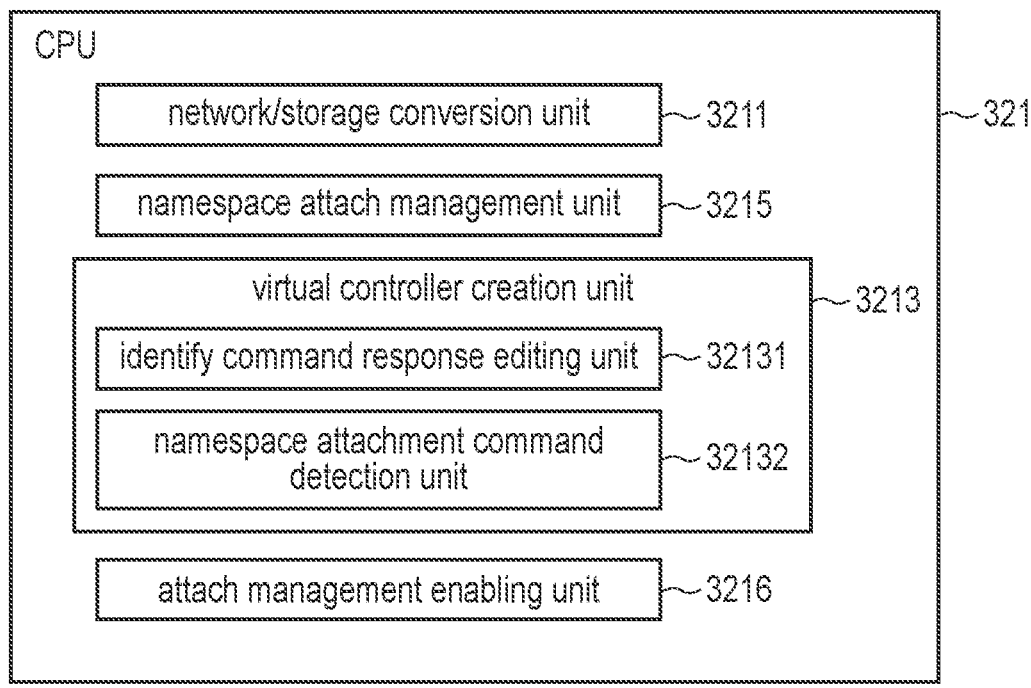
FIG. 37 is a block diagram illustrating an example of a functional configuration of a CPU included in a bridge according to the fourth embodiment.

Here, an example of a functional configuration of the CPU 321 in the fifth example of the configuration of the memory system 3 according to the fourth embodiment will be described. FIG. 37 is a block diagram illustrating an example of the functional configuration of the CPU 321 included in the network/storage bridge 32 according to the fourth embodiment. Here, a difference from the CPU 321 in the fifth example of the configuration of the memory system 3 according to the third embodiment described in FIG. 27 is focused on and will be described.

The CPU 321 in the fifth example of the configuration of the memory system 3 according to the fourth embodiment further includes an attach management enabling unit 3216.

The attach management enabling unit 3216 controls the operation of a namespace attach management unit 3215. The operation performed by the attach management enabling unit 3216 is the same as the operation performed by the attach management enabling unit 40 in the first example of the configuration of the memory system 3 according to the fourth embodiment.

Figure 38:
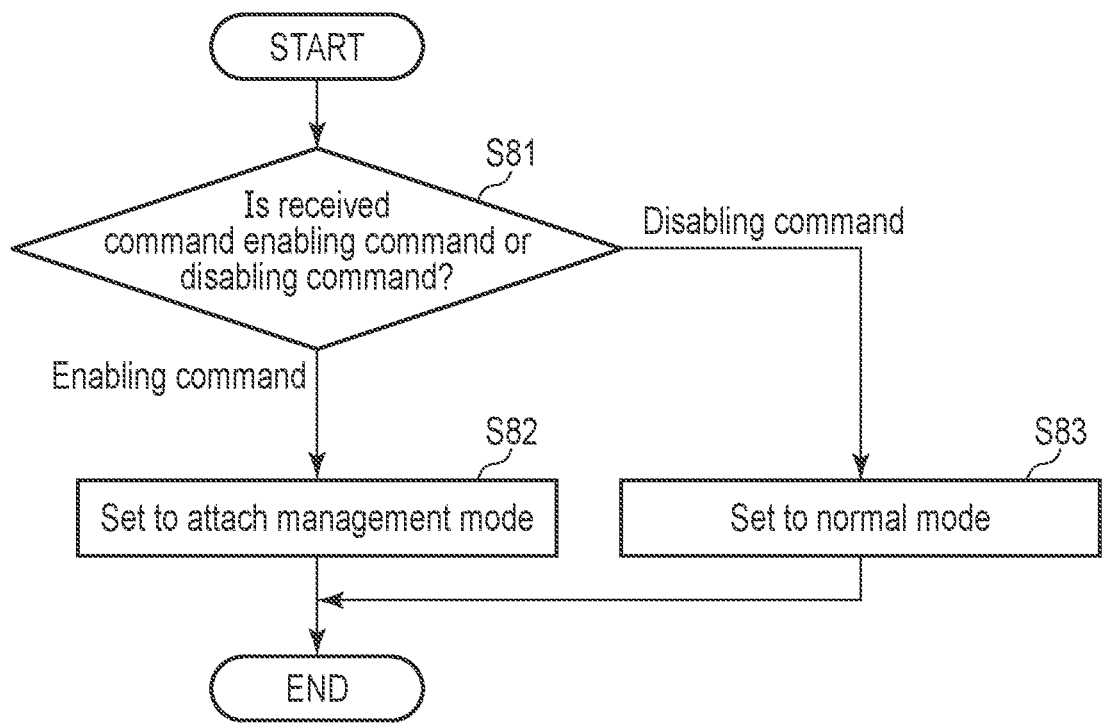
FIG. 38 is a flowchart illustrating a procedure of an operation of enabling/disabling an attaching management mode, which is performed in the memory system according to the fourth embodiment.

Next, a procedure of an operation of enabling/disabling an attaching management mode to be performed in the memory system 3 according to the fourth embodiment will be described. FIG. 38 is a flowchart illustrating a procedure of the operation of enabling/disabling the attach management mode to be performed in the memory system 3 according to the fourth embodiment.

When receiving a command related to enabling/disabling of an attach management operation from a host 2 (start), the memory system 3 determines whether the received command is an enabling command which is a command specifying enabling of the attach management operation or a disabling command specifying disabling of the attach management operation (S81).

When the received command is an enabling command (enabling command in S81), the memory system 3 sets the mode of the memory system 3 to the attach management mode (S82). Then, the memory system 3 terminates the operation of enabling the attach management mode (end).

When the received command is a disabling command (disabling command in S81), the memory system 3 sets the mode of the memory system 3 to the normal mode (S83). Then, the memory system 3 terminates the operation of disabling the attach management mode (end).

As described above, according to the fourth embodiment, it is possible to appropriately switch between a configuration in which a namespace already attached to another host is hidden from the host A2-1 or the host B2-2 and a configuration in which a namespace can be shared by a plurality of hosts, by enabling/disabling the attach management operation.

Fifth Embodiment

Figure 39:
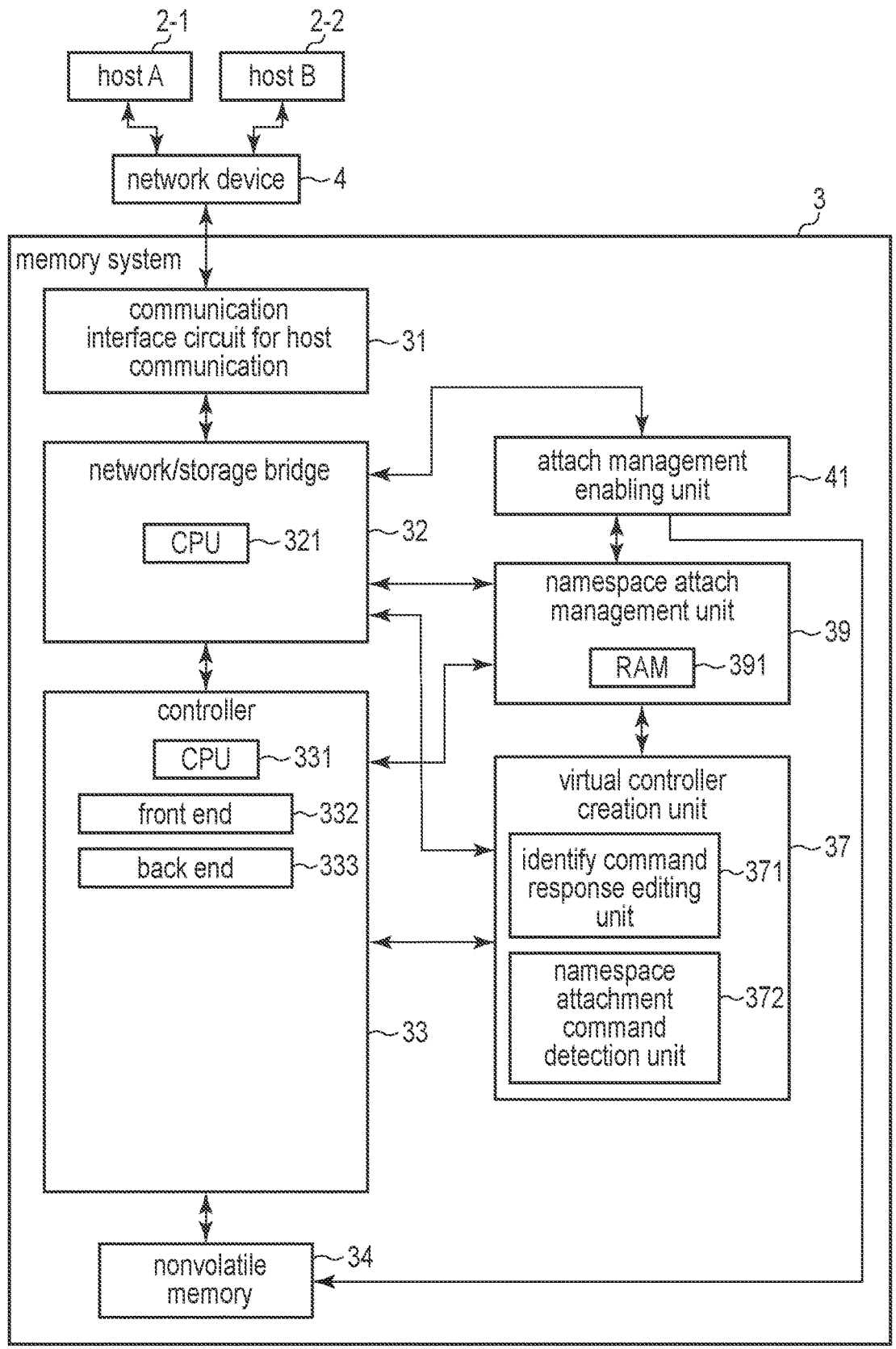
FIG. 39 is a block diagram illustrating a first example of a configuration of a memory system according to a fifth embodiment.

Next, a first example of a configuration of a memory system 3 according to a fifth embodiment will be described. The memory system 3 according to the fifth embodiment is configured to cause the nonvolatile memory 34 to store namespace attach information. FIG. 39 is a block diagram illustrating the first example of the configuration of the memory system according to the fifth embodiment. Here, a difference from the first example of the configuration of the memory system 3 according to the third embodiment described in FIG. 22 is focused on and will be described.

In the first example of the configuration of the memory system 3 according to the fifth embodiment, the memory system 3 further includes an attach information saving unit 41.

The attach information saving unit 41 is a circuit that saves the namespace attach information into the nonvolatile memory 34. The attach information saving unit 41 refers to the namespace attach information managed by a namespace attach management unit 39. When the namespace attach information is updated, the attach information saving unit 41 performs an attach information saving operation for saving the namespace attach information into the nonvolatile memory 34. In addition, the attach information saving unit 41 performs the attach information saving operation based on the reception of an attach information save command, which is a command for saving the namespace attach information, from a host A2-1 or a host B2-2 via a network/storage bridge 32. The namespace attach information stored in the nonvolatile memory 34 is used to create a virtual controller to which a namespace is attached, based on the connection of either the host A2-1 or the host A2-2 to the communication interface circuit 31 for host communication. The namespace which is attached to the virtual controller is a namespace previously attached to a host connected to the communication interface circuit 31 for host communication. For example, when the host A2-1 is connected to the communication interface circuit 31 for host communication, the controller 33 reads the namespace attach information from the nonvolatile memory 34 and transmits the read namespace attach information to the namespace attach management unit 39. The namespace attach management unit 39 stores the namespace attach information received from the controller 33 in a RAM 391. Then, based on the namespace attach information stored in the RAM 391, the virtual controller creation unit 37 creates a virtual controller to which a namespace attached to the host A2-1 is attached.

Figure 40:
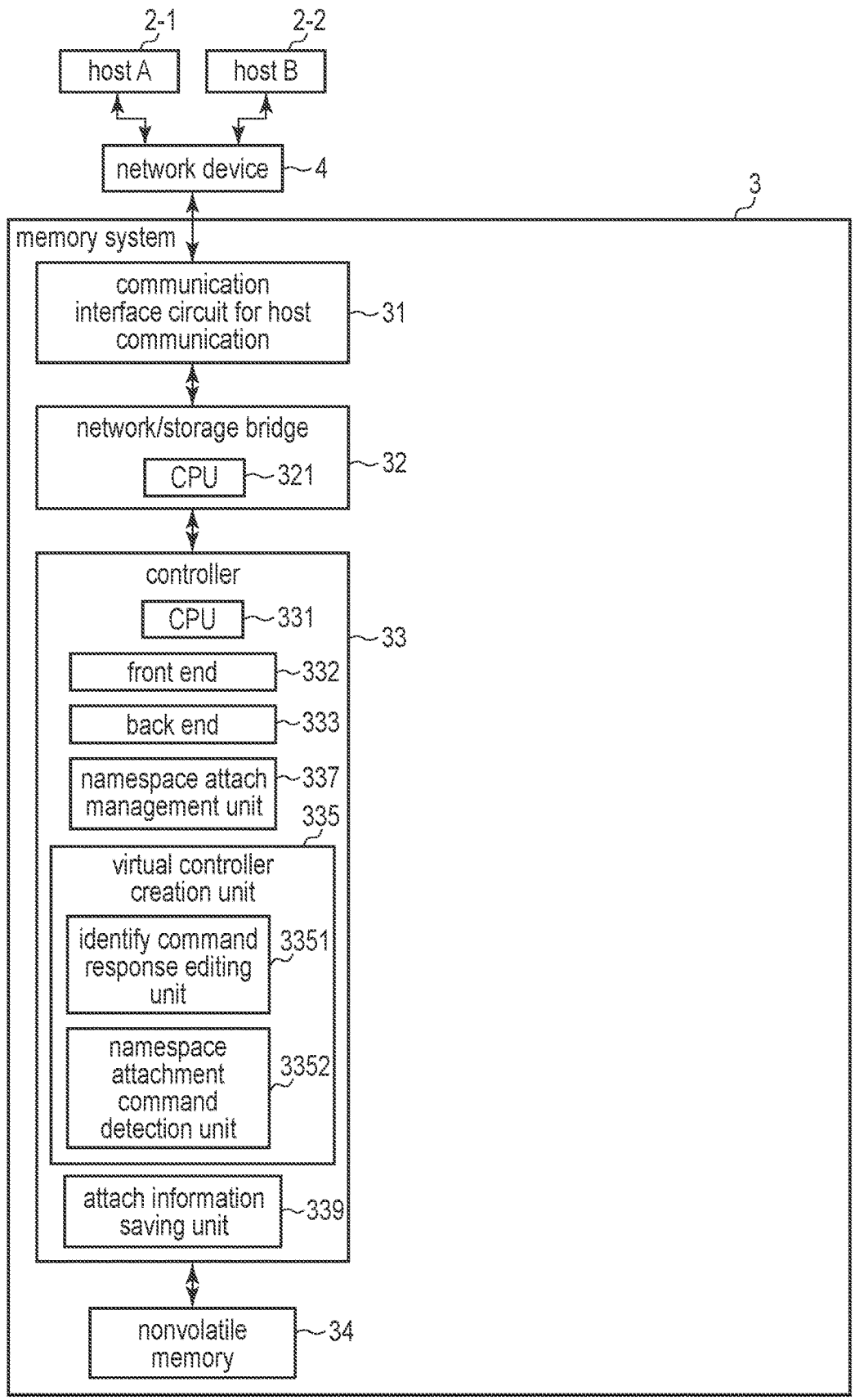
FIG. 40 is a block diagram illustrating a second example of a configuration of the memory system according to the fifth embodiment.

Next, a second example of the configuration of a memory system 3 according to the fifth embodiment will be described. In the second example of the configuration of the memory system 3, management of attachment of a namespace, an operation of creating a virtual controller, and an operation of saving the namespace attach information are performed by a circuit provided in the controller 33. FIG. 40 is a block diagram illustrating the second example of the configuration of the memory system 3 according to the fifth embodiment. Here, a difference from the second example of the configuration of the memory system 3 according to the third embodiment described in FIG. 23 is focused on and will be described.

The controller 33 in the second example of the configuration of the memory system 3 according to the fifth embodiment further includes an attach information saving unit 339.

The attach information saving unit 339 is a circuit that saves the namespace attach information into the nonvolatile memory 34. The operation performed by the attach information saving unit 339 is the same as the operation performed by the attach information saving unit 41 in the first example of the configuration of the memory system 3 according to the fifth embodiment.

Next, a third example of the configuration of the memory system 3 according to the fifth embodiment will be described. In the third configuration example of the memory system 3, a namespace attach management unit 337, a virtual controller creation unit 335, and the attach information saving unit 339 are implemented by a CPU 331 of the controller 33. The block diagram illustrating the third example of the configuration of the memory system 3 according to the fifth embodiment is the same as that in FIG. 24.

Figure 41:
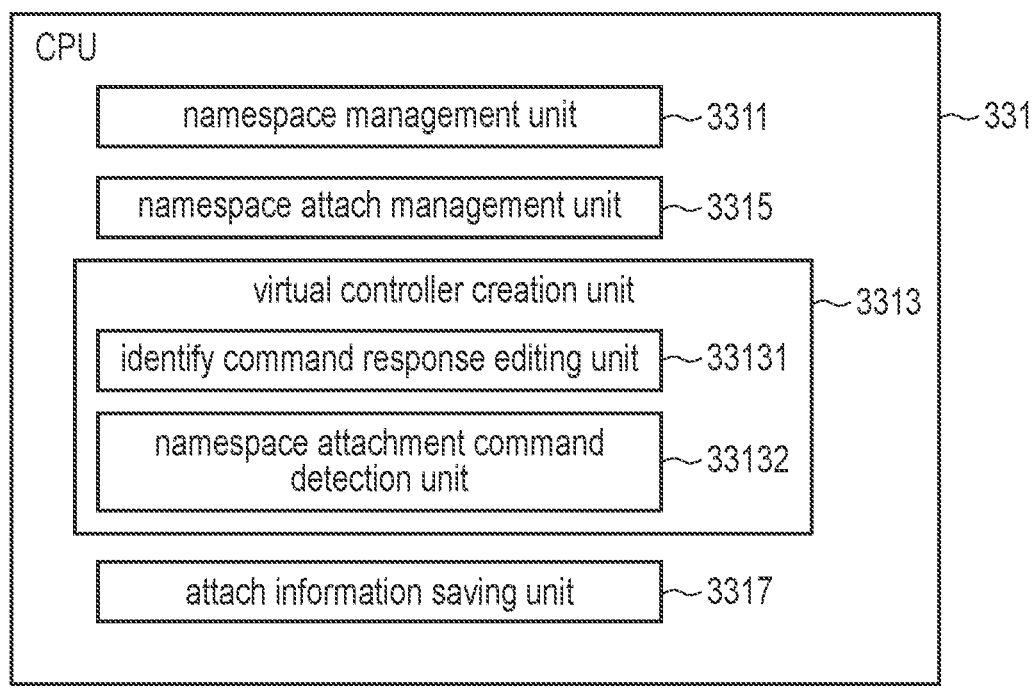
FIG. 41 is a block diagram illustrating an example of a functional configuration of a CPU included in a controller according to the fifth embodiment.

Here, an example of a functional configuration of the CPU 331 in the third example of the configuration of the memory system 3 will be described. FIG. 41 is a block diagram illustrating an example of a functional configuration of the CPU 331 included in the controller 33 in the third example of the configuration of the memory system 3 according to the fifth embodiment. Here, a difference from the example of the functional configuration of the CPU 331 in the third example of the configuration example of the memory system 3 according to the third embodiment described in FIG. 25 is focused on and will be described.

The CPU 331 in the third example of the configuration of the memory system 3 according to the fifth embodiment further includes an attach information saving unit 3317.

The attach information saving unit 3317 saves the namespace attach information into the nonvolatile memory 34. The operation performed by the attach information saving unit 3317 is the same as the operation performed by the attach information saving unit 41 in the first example of the configuration of the memory system 3 according to the fifth embodiment.

Figure 42:
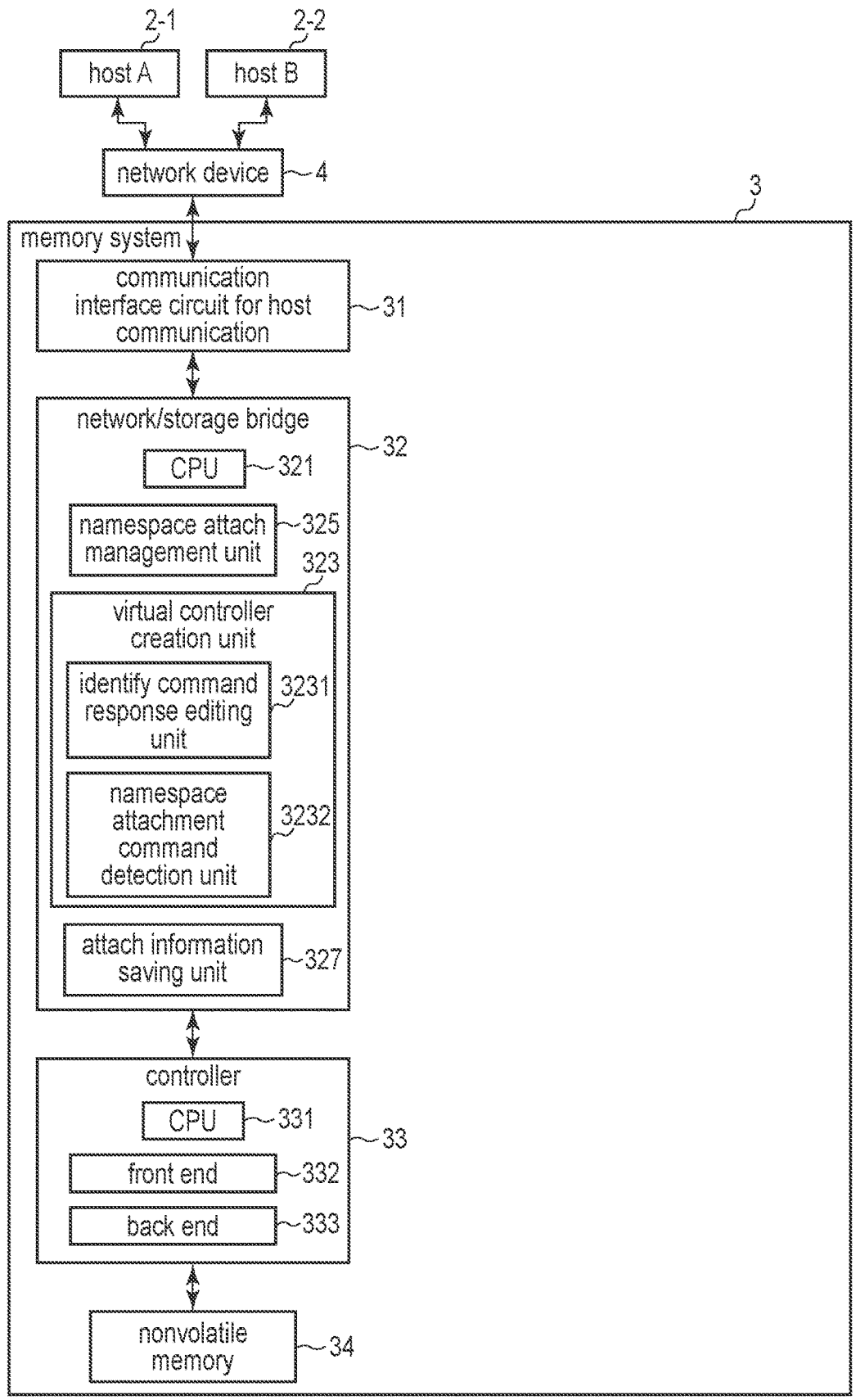
FIG. 42 is a block diagram illustrating a fourth example of a configuration of the memory system according to the fifth embodiment.

Next, a fourth configuration example of the memory system 3 according to the fifth embodiment will be described. In the fourth configuration example of the memory system 3, management of attachment of a namespace, an operation of creating a virtual controller, and an operation of storing the namespace attach information are performed by a circuit provided in the network/storage bridge 32. FIG. 42 is a block diagram illustrating the fourth configuration example of the memory system 3 according to the fifth embodiment. Here, a difference from the fourth configuration example of the memory system 3 according to the third embodiment described in FIG. 26 is focused on and described.

The network/storage bridge 32 in the fourth configuration example of the memory system 3 according to the fifth embodiment further includes an attach information saving unit 327.

The attach information saving unit 327 is a circuit that stores the namespace attach information in the nonvolatile memory 34. The operation performed by the attach information saving unit 327 is the same as the operation performed by the attach information saving unit 41 in the first configuration example of the memory system 3 according to the fifth embodiment.

Next, a fifth configuration example of the memory system 3 according to the fifth embodiment will be described. In the fifth configuration example of the memory system 3, a namespace attach management unit 325, a virtual controller creation unit 323, and the attach information saving unit 327 are implemented by a CPU 321 of the network/storage bridge 32. The block diagram illustrating the fifth configuration example of the memory system 3 according to the fifth embodiment is the same as that in FIG. 24.

Figure 43:
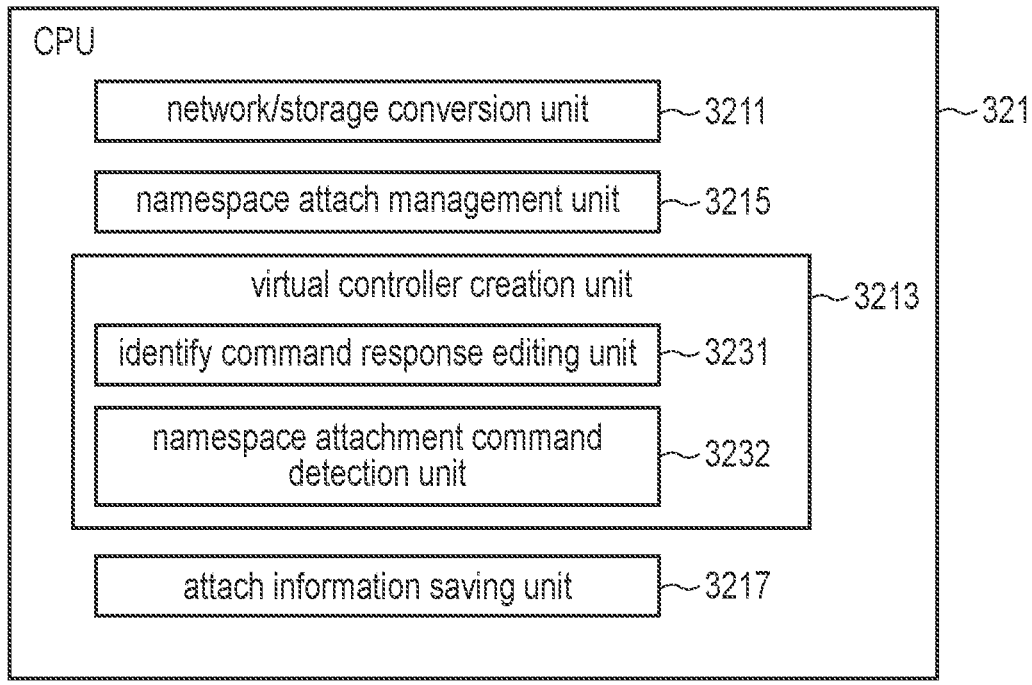
FIG. 43 is a block diagram illustrating an example of a functional configuration of a CPU included in a bridge according to the fifth embodiment.

Here, an example of a functional configuration of the CPU 321 in the fifth configuration example of the memory system 3 will be described. FIG. 43 is a block diagram illustrating an example of the functional configuration of the CPU 321 included in the network/storage bridge 32 in the fifth configuration example of the memory system 3 according to the fifth embodiment. Here, a difference from the example of the functional configuration of the CPU 321 in the fifth configuration example of the memory system 3 according to the third embodiment described in FIG. 27 is focused on and described.

The CPU 321 in the fifth configuration example of the memory system 3 according to the fifth embodiment further includes an attach information saving unit 3217.

The attach information saving unit 3217 stores the namespace attach information in the nonvolatile memory 34. The operation performed by the attach information saving unit 3217 is the same as the operation performed by the attach information saving unit 41 in the first configuration example of the memory system 3 according to the fifth embodiment.

Figure 44:
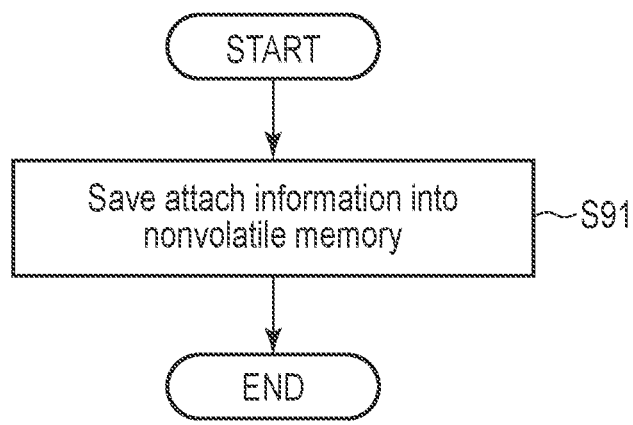
FIG. 44 is a flowchart illustrating a procedure of an attach information saving operation performed in the memory system according to the fifth embodiment.

Next, an attach information saving operation in the memory system 3 according to the fifth embodiment will be described. FIG. 44 is a flowchart illustrating a procedure of the attach information saving operation to be performed in the memory system according to the fifth embodiment.

When the namespace attach information is updated or an attach information save command is received from a host 2 (start), the memory system 3 stores the namespace attach information in the nonvolatile memory 34 (S91). Then, the memory system 3 terminates the attach information saving operation (end).

Figure 45:
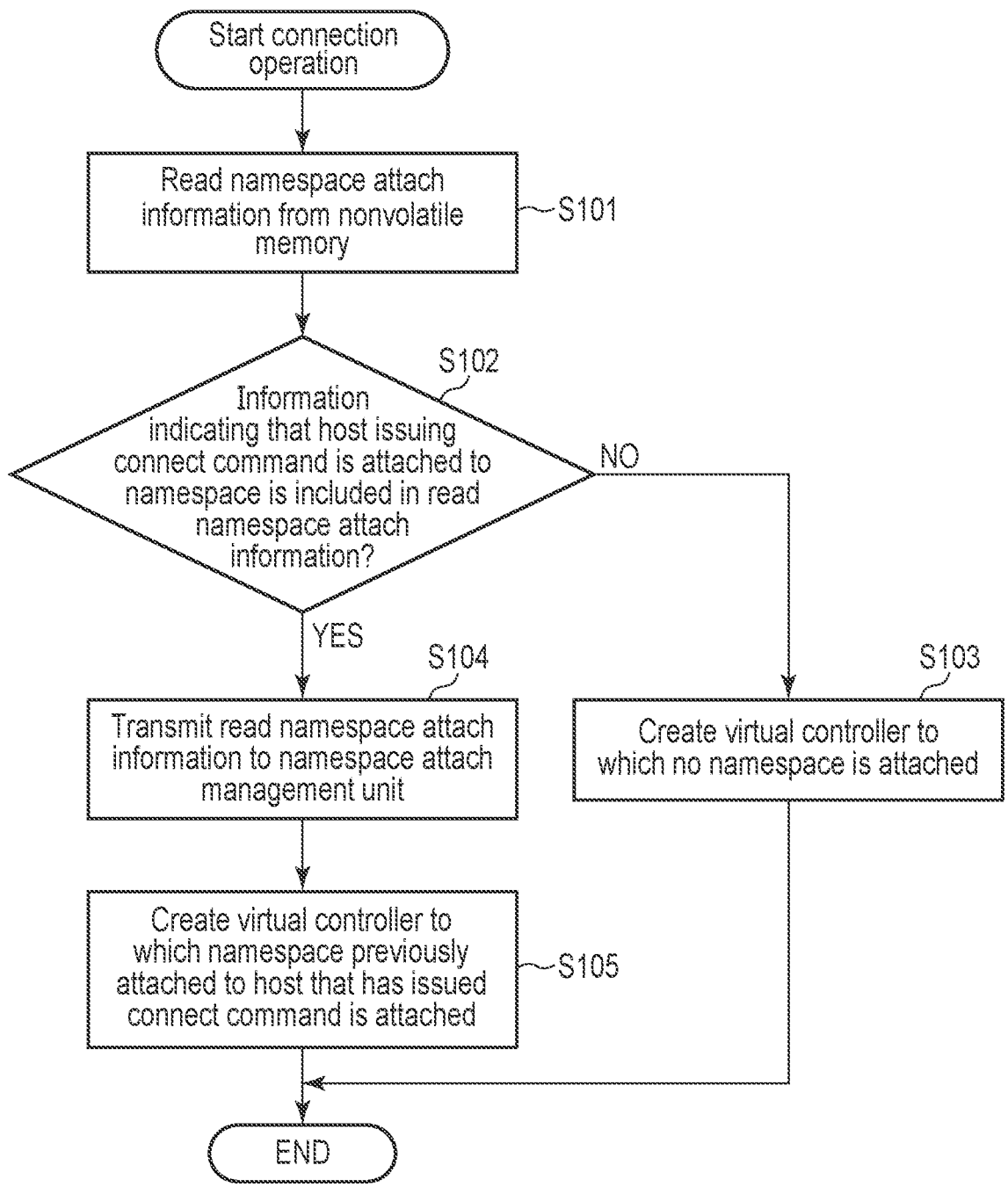
FIG. 45 is a flowchart illustrating a procedure of a connection operation performed in the memory system according to the fifth embodiment.

Next, a connection operation between the memory system 3 and the host 2 according to the fifth embodiment will be described. FIG. 45 is a flowchart illustrating a procedure of the connection operation to be performed in the memory system 3 according to the fifth embodiment.

When a connect command is received from the host 2 (start), the memory system 3 reads the namespace attach information from the nonvolatile memory 34 (S101). Specifically, the controller 33 reads the namespace attach information from the nonvolatile memory 34.

The memory system 3 determines whether the read namespace attach information includes information indicating that a namespace is attached to the host 2 that has issued the connect command (S102).

When the read namespace attach information does not include information indicating that a namespace is attached to the host 2 that has issued the connect command (No in S102), the memory system 3 creates a virtual controller to which no namespace is attached, as a virtual controller to be provided to the host 2 that has issued the connect command (S103). Then, the memory system 3 terminates the connection operation (end).

When the read namespace attach information includes information indicating that a namespace is attached to the host 2 that has issued the connect command (Yes in S102), the memory system 3 transmits the read namespace attach information to the namespace attach management unit 39 (or any one of the namespace attach management units 325, 337, 3215, and 3315) (S104). For example, the controller 33 of the memory system 3 transmits the read namespace attach information to the namespace attach management unit 39. The namespace attach management unit 39 stores the namespace attach information received from the controller 33 in the RAM 391.

Based on the namespace attach information transmitted to the namespace access management unit 36 (or any one of the namespace access management units 322, 334, 3212, and 3312), the memory system 3 creates a virtual controller to which the namespace previously attached to the host 2 that has issued the connect command is attached, as a virtual controller to be provided to the host 2 that has issued the connect command (S105). Then, the memory system 3 terminates the connection operation (end).

As described above, according to the fifth embodiment, the namespace attach information (attachment information) is stored in the nonvolatile memory 34. Therefore, even if the supply of the power to the memory system 3 is turned off or the memory system 3 is reset, the previous namespace attach information can be restored based on the reception of the connect command. Accordingly, it is possible to shorten the downtime of the memory system 3 at the time of failure recovery or maintenance of the memory system 3.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
a nonvolatile memory;
a controller configured to control the nonvolatile memory;
a communication interface connectable to a plurality of hosts;
a virtual controller creation unit that is a circuit configured to create a virtual controller based on connection of a host to the communication interface; and
an access management unit that is a circuit configured to manage permission information, wherein
the controller is configured to manage a plurality of namespaces,
each of the plurality of namespaces is associated with a storage area of a plurality of storage areas of the nonvolatile memory,
the permission information is information indicating a correspondence between each of the plurality of namespaces and a host permitted to access the namespace, and
the virtual controller creation unit is configured to create, based on the permission information, a first virtual controller to which a namespace that a first host connected to the communication interface is permitted to access is attached, as a virtual controller to be used by the first host to access the nonvolatile memory.

2. The memory system according to claim 1, wherein the access management unit is configured to store the permission information in the nonvolatile memory.

3. The memory system according to claim 2, wherein the controller is configured to read the permission information from the nonvolatile memory and transmit the read permission information to the access management unit when power is supplied to the memory system or when the memory system is reset.

4. The memory system according to claim 1, wherein the access management unit and the virtual controller creation unit are included in the controller.

5. The memory system according to claim 1, wherein each of the access management unit and the virtual controller creation unit is hardware different from the controller.

6. A memory system comprising:
a nonvolatile memory;
a controller configured to control the nonvolatile memory;
a communication interface connectable to a plurality of hosts;
a virtual controller creation unit that is a circuit configured to create a virtual controller based on connection of a host to the communication interface;
an attach management unit that is a circuit configured to manage attachment information;
a command response unit that is a circuit configured to transmit a response to the host; and
an attachment command detection unit that is a circuit configured to detect a namespace attachment command received from the host, wherein
the controller is configured to manage a plurality of namespaces,
each of the plurality of namespaces is associated with a storage area of a plurality of storage areas of the nonvolatile memory,
the attachment information is information indicating a correspondence between each of the namespaces and a host to which the namespace is attached,
the virtual controller creation unit is configured to create, based on connection of a first host to the communication interface, a first virtual controller to which no namespace is attached, as a virtual controller to be used by the first host to access the nonvolatile memory,
the command response unit is configured to generate, based on the attachment information, information indicating a list of namespaces excluding a namespace attached to a host other than the first host and transmits the generated information to the first host when a first command for acquiring a list of the plurality of namespaces is received from the first host,
the attachment command detection unit is configured to update the attachment information based on detection of a first namespace attachment command requesting attachment of a first namespace, the first namespace attachment command being received from the first host, in a manner such that information indicating a correspondence between the first namespace and the first host is added to the attachment information, and
the virtual controller creation unit is configured to attach, based the updated attachment information, the first namespace to the first virtual controller.

7. The memory system according to claim 6, wherein the attachment command detection unit is configured to update, based on detection of a second namespace attachment command which is received from the first host and specifies detachment of the first namespace, the attachment information such that the information indicating the correspondence between the first namespace and the first host is deleted from the attachment information, and
the virtual controller creation unit is configured to detach, based on the updated attachment information, the first namespace from the first virtual controller when the attachment information is updated.

8. The memory system according to claim 7, wherein the attach management unit is configured to saves the attachment information into the nonvolatile memory.

9. The memory system according to claim 8, wherein the controller is configured to read the attachment information from the nonvolatile memory and transmits the read attachment information to the attach management unit, based on connection of the first host to the communication interface, and
the virtual controller creation unit is configured to create, based on the attachment information, the first virtual controller to which a namespace previously attached to the first host is attached.

10. The memory system according to claim 6, wherein when the first host and the communication interface are disconnected,
the attach management unit is configured to delete information indicating the first host from the attachment information, and
the virtual controller creation unit is configured to detach all namespaces attached to the first virtual controller from the first virtual controller.

11. The memory system according to claim 6 further comprising:
an attach management enabling unit that is a circuit configured to enable or disable the attach management unit, wherein
the virtual controller creation unit is configured to create a virtual controller to which all of the plurality of namespaces are attached for each host when the attach management unit is disabled.

12. The memory system according to claim 6, wherein the attach management unit and the virtual controller creation unit are included in the controller.

13. The memory system according to claim 6, wherein each of the attach management unit and the virtual controller creation unit is hardware different from the controller.

* * * * *